United States Patent [19]
Wildi

[11] Patent Number: 5,854,472
[45] Date of Patent: Dec. 29, 1998

[54] LOW-VOLTAGE AND LOW FLUX DENSITY HEATING SYSTEM

[75] Inventor: Theodore Wildi, Quebec, Canada

[73] Assignee: Sperika Enterprises Ltd., Quebec, Canada

[21] Appl. No.: 659,180

[22] Filed: Jun. 6, 1996

[51] Int. Cl.⁶ ..................................................... H05B 3/34
[52] U.S. Cl. ........................... 219/549; 219/212; 219/529
[58] Field of Search ........................... 219/211–219, 600, 219/546–553, 528–529; 361/103

[56] References Cited

U.S. PATENT DOCUMENTS

| | | |
|---|---|---|
| 2,042,742 | 6/1936 | Taylor . |
| 2,287,502 | 6/1942 | Togesen et al. . |
| 3,213,300 | 10/1965 | Davis . |
| 3,223,825 | 12/1965 | Williams . |
| 3,364,335 | 1/1968 | Palatini et al. . |
| 4,788,394 | 11/1988 | Vanneste et al. ........................ 219/600 |
| 4,908,497 | 3/1990 | Hjortzberg . |
| 4,912,306 | 3/1990 | Grise et al. .............................. 219/549 |
| 4,998,006 | 3/1991 | Perlman ................................... 219/212 |
| 5,081,341 | 1/1992 | Rowe . |
| 5,380,981 | 1/1995 | Feldman et al. ......................... 219/219 |
| 5,541,803 | 7/1996 | Pope, Jr. et al. ........................ 361/103 |

OTHER PUBLICATIONS

Governmental Industrial Hygientists entitled "Sub–Radio Freuency", p. 55.

*Primary Examiner*—Tu Ba Hoang
*Attorney, Agent, or Firm*—Swabey Ogilvy Renault; Guy J. Houle

[57] ABSTRACT

An low-voltage heating system that produces a reduced magnetic field and which uses insulated copper wires, or equivalents, as heating elements. Its low operating temperature, robustness and safety enable the system to be installed in floors and walls for the general heating of buildings, and in outdoor pavements, for snow-melting purposes. The feeder busbars are configured to reduce the magnetic field around the feeder. A monitoring network continually checks the integrity of the heating system.

36 Claims, 14 Drawing Sheets

5,854,472

LOW-VOLTAGE AND LOW FLUX DENSITY HEATING SYSTEM

TECHNICAL FIELD

This invention relates to an extra-low-voltage heating system wherein the magnetic field is reduced, both around the heating cables and the feeder that supplies power to the cables. Each cable contains six wires that are configured and interconnected in a specific way so as to minimize the magnetic field surrounding the cable.

Also, the heating cables are themselves configured so as to reduce the magnetic field at points that are close to the heated surface. In 3-phase heating systems, the wires of the heating cables are interconnected in either delta or wye form in a specific way. In single-phase heating systems, the said delta form is also connected and configured in a specific way. By positioning a bare conductor in close proximity to the six wires, and connecting it to a monitoring device, we can continually monitor the integrity of the system.

BACKGROUND ART

Extra-low-voltage systems for heating concrete floors have been used in the past by circulating an electric current in the reinforcing steel wire mesh within a concrete slab. In these 60 Hz systems, the voltage is typically limited to a maximum of 30 volts. These extra-low-voltage systems offer many advantages, but they also have some shortcomings as follows:

1. On account of the low voltage, large currents are required, which generate a strong magnetic field around the busbars and wire meshes.
2. The magnetic field interferes with the image on some computer and television screens, causing it to jitter. It has been found that in order to reduce the jitter to an acceptable level, the peak flux density must be less than 5 microteslas (5 $\mu$T), which corresponds to 50 milligauss (50 mG). In some extra-low-voltage heating systems of the prior art, the flux density can exceed 100 $\mu$T (1000 mG) at a distance of 5 feet above the floor.
3. The magnetic field is perceived by some people to be a potential health hazard. Opinions vary as to the acceptable exposure limits to 50 Hz and 60 Hz magnetic fields. In a publication by the American Conference of Governmental Industrial Hygienists entitled *Sub-Radio Frequency* (30 kHz and below) Magnetic Fields, continuous exposure limits of 100 $\mu$T (1000 mG) are suggested for members of the general public.

It should be noted that the ambient 60 Hz flux density in a home is typically 1 mG to 2 mG, while that along a busy street ranges from 0.5 mG to 5 mG. The flux density near a coffee machine equipped with an electric clock varies from 10 mG to over 100 mG, depending upon the distance from the machine.

The SI unit of magnetic flux density is the tesla. One microtesla (1 $\mu$T) is equal to 10 milligauss (10 mG).

This concern with possible biological effects has given rise to several methods of reducing the magnetic fields of electric heating systems. In this regard, we make reference to the following patents:

U.S. Pat. No. 5,081,341 to William M. Rowe issued Jan. 14, 1992, describes how a magnetic field can be reduced by arranging wires in a helical manner so that currents flow in essentially opposite directions. U.S. Pat. No. 4,998,006 to Daniel Perlman issued on Mar. 5, 1991, there is described how a magnetic field can be reduced by arranging wires in parallel so that currents flow in essentially opposite directions. U.S. Pat. No. 4,908,497 to Bengt Hjortsberg, issued Mar. 13, 1990, describes how a magnetic field can be reduced by arranging successive rows of four wires in series so that currents flow in essentially opposite directions. These patents are mainly concerned with low-power devices such as comfort heaters and water beds that are in particularly close contact with the human body.

U.S. Pat. No. 3,364,335 to B. Palatini et al, issued on Jan. 16, 1968 describes a relatively high voltage three-phase heating system to reduce the size of the conductors. The objective is to eliminate the danger of high voltages by using a differential protection. There is no mention of magnetic fields. U.S. Pat. No. 3,223,825 to C. I. Williams issued on Dec. 14, 1965 discloses the use of reinforcing steel bars in concrete to carry heating current. Three-phase power is used but the individual heating of bars is single-phase. Various circuit configurations are given with design examples. There is no mention of magnetic fields. U.S. Pat. No. 2,042,742 to J. H. Taylor issued on Jun. 2, 1936 discloses the use of a 3-conductor insulated heating cable mounted on a panel, but no 3-phase source. The low temperature system uses copper wire as heating element. The Patent also states that circuits of considerable length can be made this way. There is no mention of magnetic fields. U.S. Pat. No. 3,213,300 to R. S. DAVIS issued on Oct. 19, 1965 describes the use of a low reactance cable. Finally, U.S. Pat. No. 2,287,502 to A. A. TOGESEN issued on Jun. 23, 1942 describes "closely spaced busbars within the pairs, effects a reduction in the magnetic field."

BACKGROUND INFORMATION

It is well known that an ac current flowing in a long, straight wire produces an alternating magnetic field in the space around the wire. The magnetic field is constantly increasing, decreasing and reversing. In a 60 Hz system, the flux density reaches its maximum value 120 times per second. The flux density is given by the well-known physical equation:

$$B = \frac{2I}{x} \qquad (1)$$

in which

B=maximum flux density at the point of interest, in milligauss [mG]

I=peak current flowing in the wire, in amperes [A]

x=shortest distance between the center of the wire and the point of interest, in meters [m].

Among its other features, the invention disclosed herein describes a 3-phase heating cable that produces a particularly low magnetic field. In commercial 3-phase installations, the three currents $I_A$, $I_B$, $I_C$ flowing in a 3-wire cable vary sinusoidally according to the equations:

$$I_A = I_m \cos \omega t \qquad (2)$$

$$I_B = I_m \cos (\omega t - 120) \qquad (3)$$

$$I_C = I_m \cos (\omega t - 240) \qquad (4)$$

In these equations, $I_m$ is the peak current, $\omega$ is the angular frequency in degrees per second, t is the time in seconds, and $\omega t$ is the time expressed in electrical degrees. Table 1 shows the instantaneous currents flowing in the three wires at various instants of time, during one cycle. An angle $\omega t$ of 360 degrees corresponds to $1/f$ seconds, where $f$ is the frequency of the power source.

TABLE 1

| ωt  | $I_A$           | $I_B$           | $I_C$           |
|-----|-----------------|-----------------|-----------------|
| 0   | $I_m$           | $-0.5\,I_m$     | $-0.5\,I_m$     |
| 30  | $0.866\,I_m$    | 0               | $-0.866\,I_m$   |
| 60  | $0.5\,I_m$      | $0.5\,I_m$      | $-I_m$          |
| 90  | 0               | $0.866\,I_m$    | $-0.866\,I_m$   |
| 120 | $-0.5\,I_m$     | $I_m$           | $-0.5\,I_m$     |
| 150 | $-0.866\,I_m$   | $0.866\,I_m$    | 0               |
| 180 | $-I_m$          | $0.5\,I_m$      | $0.5\,I_m$      |
| 210 | $-0.866\,I_m$   | 0               | $0.866\,I_m$    |
| 240 | $-0.5\,I_m$     | $-0.5\,I_m$     | $I_m$           |
| 270 | 0               | $-0.866\,I_m$   | $0.866\,I_m$    |
| 300 | $0.5\,I_m$      | $-I_m$          | $0.5\,I_m$      |
| 330 | $0.866\,I_m$    | $-0.866\,I_m$   | 0               |
| 360 | $I_m$           | $-0.5\,I_m$     | $-0.5\,I_m$     |

The instantaneous magnetic field surrounding a cable depends upon the configuration of the wires and the instantaneous currents they carry. Because the currents are alternating, they change in value and direction from one instant to the next. It is therefore necessary to determine when the flux density is maximum and what its value is at that particular moment. I have derived formulas, based upon Eq. (1), that describe the flux densities around cables having different wire configurations. I narrowed the choice down to one three-phase wire configuration that produces especially good results. It involves a cable having six wires; the formulas for this special configuration are revealed in subsequent sections.

When heating a flat surface, such as a wall or floor, the magnetic flux density above the surface depends upon the vector sum of the flux densities produced by all the cables. Thus, to determine the maximum flux density at a given point perpendicular to the surface, the configuration of the cables has to be taken into account, in addition to the configuration of the wires within the cables. I have found that a specific cable configuration produces particularly low flux densities at points located close to the heated surface.

SUMMARY OF THE INVENTION

This invention concerns an extra-low-voltage, 3-phase heating system that produces a particularly low magnetic flux density. It comprises a plurality of 3-phase heating cables that are connected to a common 3-phase feeder. The feeder is powered by a step-down transformer whose secondary line-to-line voltage is 30 V or less, to remain within the extra-low-voltage class.

The heating system is principally, although not exclusively, intended for heating a flat surface and among its several applications, the system is designed for direct burial in a concrete floor, with the cables lying about 50 mm below the surface. The cables are designed to produce a specified amount of thermal power per unit length, $P_C$ (watts per meter). The maximum value of $P_C$ depends upon the maximum allowable temperature of the cable. The temperature is typically limited to a maximum of 60° C. or 90° C. Consequently, the heating system can be considered to be a low-temperature system. When desired, values of $P_C$ less than said maximum can be used.

Cable runs of individual cables are generally of equal length and laid out in sinuous fashion. The cable runs are laid out side by side, with the distance between runs being determined by $P_C$ and the required thermal power density $P_D$ (watts per square meter).

The invention seeks to reduce the magnetic flux density around the cables, around the heated surface, and around the feeder. The invention also includes a monitoring system whereby potential damage to cables may be detected, causing power to be disconnected. The monitoring means also enables the fault to be located.

Each heating cable of this invention comprises six insulated wires, arranged in two rows of three wires, with the rows in juxtaposition. The wires and rows are in close proximity to each other. The wires in the cable are specially configured and interconnected so as to minimize the magnetic field around the individual cables. The wires can be connected in either delta or wye to create what I respectively call a delta cable and wye cable, for purposes of ready identification. Furthermore, the cables themselves are configured to reduce even more the resultant flux density near the flat heated surface. Similarly, the busbars of the feeder are specially configured to reduce the magnetic flux density around the feeder. The said wires and busbars are made of a low resistivity material, such as copper.

The said delta cable can also be powered by a single-phase source by connecting it to the source in a specific way. The specific connection is designed to minimize the magnetic field around the cable.

The present invention also includes special formulas that have been derived to permit the approximate calculation of the magnetic fields produced around the cables.

The following features also form part of this invention:

1) Safety. The extra-low-voltage of the heating system ensures safety from electric shock;
2) Robustness. The cable contains six wires and hence is particularly able to withstand mechanical abuse when it is installed;
3) Insulation. The cable and its wires are insulated; consequently, the cables can come in direct contact with adjoining metal parts;
4) Balanced 3-phase system. The heating cables constitute an inherently balanced three-phase load which meets electric power utility requirements.
5) Low temperature. The heating system operates at low temperatures which ensures long life and reduces the fire hazard.

BRIEF DESCRIPTION OF DRAWINGS

A preferred embodiment of the present invention will now be described with reference to the accompanying drawings, which show various examples of the invention, including its several advantages.

DESCRIPTION OF PREFERRED EMBODIMENTS

Figure 1:
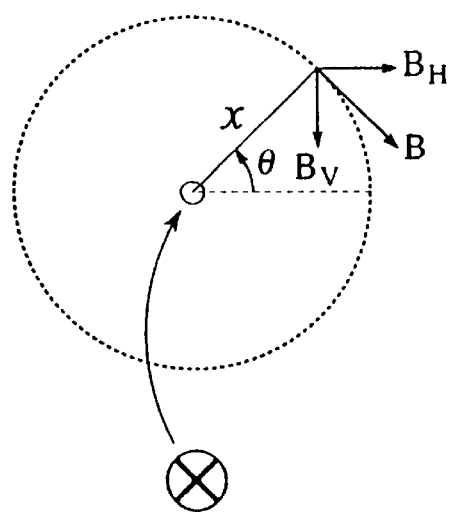
FIG. 1 is a schematic diagram showing the cross section of a single wire carrying a current and the resulting magnetic flux density it produces, together with the horizontal and vertical components of the flux density.

Referring to FIG. 1, there is shown the cross section of a single wire carrying an alternating current having an instantaneous value 1. The "cross" of the conventional dot/cross notation indicates that the current is flowing into the page. As previously stated, the value of the flux density is given by:

$$B = \frac{2I}{x} \qquad \text{Eq. 1}$$

It is well known that this flux density is directed at right angles to a ray having a radius x whose origin coincides with the center of the wire. It follows that the horizontal and vertical flux density components $B_H$ and $B_V$ at the end of a ray inclined at θ degrees to the horizontal, are respectively given by:

$$B_H = B \sin\theta \qquad (5)$$
$$B_V = B \cos\theta \qquad (6)$$

For the current direction shown (into the page), positive values of $B_H$ are directed to the right, while positive values of $B_V$ are directed downwards.

Figure 2A:
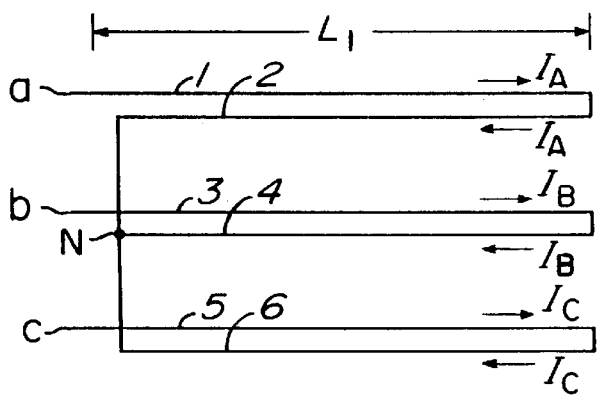
FIG. 2a is a schematic diagram showing a six-wire wye cable.

FIG. 2a is a schematic diagram showing a cable having six straight wires 1, 2, 3, 4, 5, 6 that are parallel and in close proximity to each other. The cable has a length $L_1$. Wires 2, 4, 6 are connected together at junction N while wire leads a, b, c are connected to a 3-phase source (not shown). The wires are therefore connected in wye. For convenience, I call this a wye cable.

The wires carry 3-phase sinusoidal alternating currents $I_A$, $I_B$, $I_C$, which respectively flow in the wire pairs 1,2; 3,4; and 5,6, as shown in the Figure. The line currents flowing in leads a, b, c reach peak values of $I_{Y3}$ where subscript Y stands for wye and subscript 3 stands for 3-phase source. The currents are considered to be positive when they flow in the direction of the arrows. For example, when $I_B$=+17 A, the current $I_B$ is actually flowing in the direction of the arrows shown for wires 3 and 4.

Figure 2B:
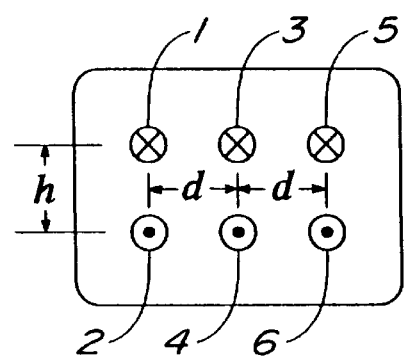
FIG. 2b shows its cross section and wire configuration.

FIG. 2b is a cross section view of the wye cable, showing the preferred configuration of the six wires. The wires are arranged in two rows of 3 wires, with the rows in juxtaposition. Wires 1,3,5 and 2,4,6 are respectively coplanar and the two rows are parallel to each other and separated by a distance h. The distance between adjacent wires in each row is d. Distances d and h are measured between the centers of the wires.

In the upper row, outer wires 1 and 5 are respectively on the left-hand side and right-hand side of inner wire 3. Similarly, in the lower row, outer wires 2 and 6 are respectively on the left-hand side and right-hand side of inner wire 4.

Figure 3:
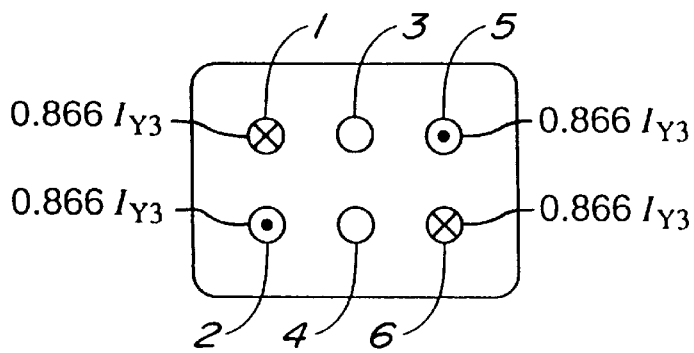
FIG. 3 is a schematic cross section view of a 3-phase wye cable, showing the magnitude and actual direction of current flows in the wires, at the moment when the flux density surrounding the cable is maximum.

The crosses and dots in FIG. 2b indicate the direction of current flow when the respective currents are positive. Thus, when $I_B$=+17 A, the current in wire 3 is 17 A flowing into the page, while the return current of 17 A in wire 4 flows out of the page (toward the reader). The flux density surrounding the cable changes from instant to instant but it reaches a maximum during each half cycle. I have discovered that when the wires are configured as shown in FIG. 2b, the flux density surrounding the cable is maximum when the current in the inner wires 3 and 4 is zero. Based upon the information given in Table 1, this means that the instantaneous currents in the outer wires 1,2,5,6 are equal (in magnitude) to 0.866 $I_{Y3}$. Furthermore, at this instant, the currents in one set of diagonally opposite outer wires flow in one direction while the currents in the other set of diagonally opposite outer wires flow in the opposite direction. Thus, as shown in FIG. 3, when current in wire 1 flows into the page, then current in wire 6 also flows into the page. On the other hand, at this same instant, the currents in wires 2 and 5 flow out of the page. One half cycle later, the currents will have the same magnitudes but their respective directions will be the opposite to that shown in FIG. 3.

Figure 4:
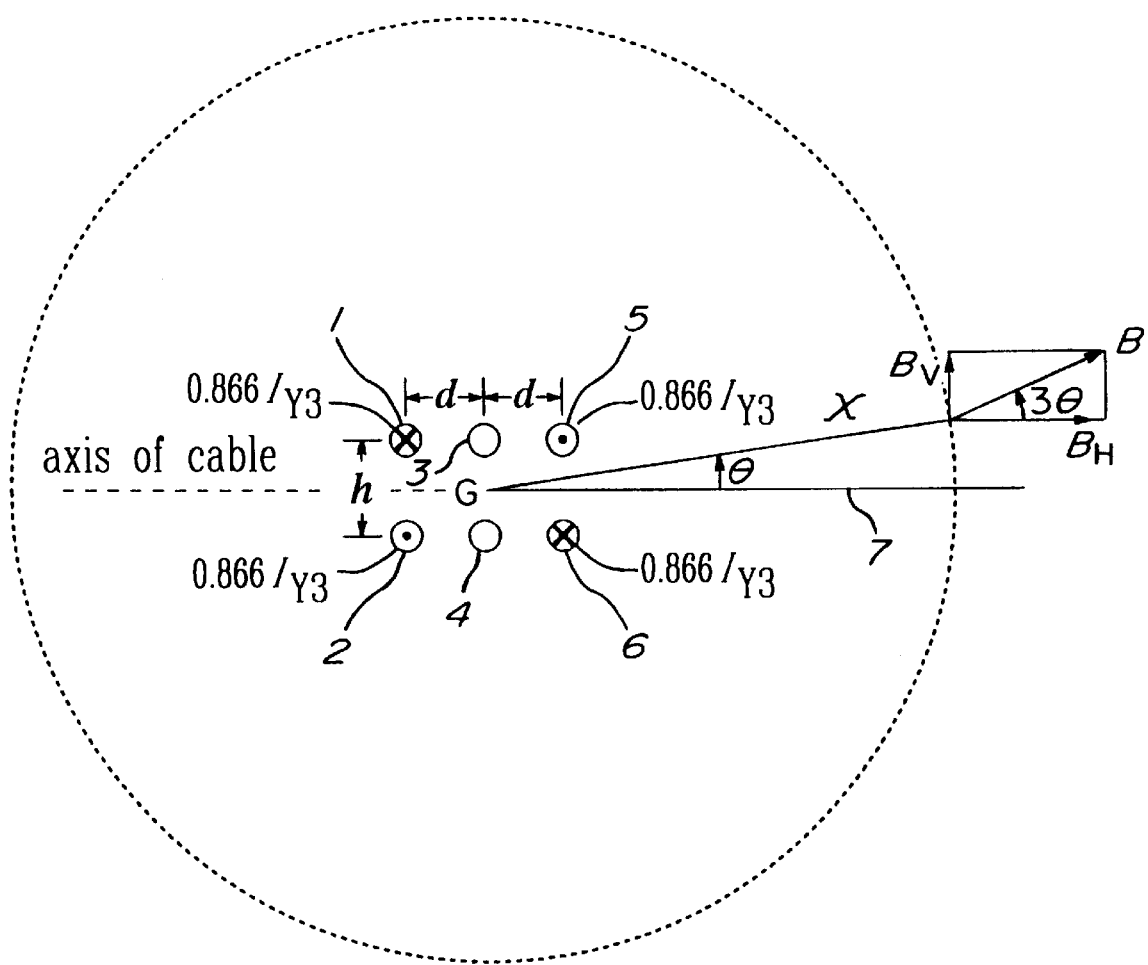
FIG. 4 is a cross section view of a 3-phase wye cable, showing the magnitude and direction of current flow and the resulting flux density components when the flux density is maximum.

I have derived an expression for the flux density surrounding the cable at this particular moment of maximum flux density. Referring to FIG. 4, consider a ray 7 that lies on the horizontal axis of the wye cable and extends to the right from the geometric center G of the six wires. Next, consider a ray of length x inclined at an angle θ to the horizontal axis. It turns out that the maximum flux density at this distance x is given approximately by the expression:

$$B = \frac{4\sqrt{3} I_{Y3} h d}{x^3} \quad (7)$$

The horizontal and vertical components of this flux density are found to be respectively:

$$B_H = B \cos 3\theta \quad (8)$$

$$B_V = B \sin 3\theta \quad (9)$$

In these equations,
B=maximum flux density, [mG];
x=radial distance from the geometric center of the six wires, [m];
$I_{Y3}$=peak line current of the wye cable, [A];
h=distance between rows, [m];
d=distance between adjacent wires in one row, [m];
θ=angle between the horizontal axis of the cable and the ray joining its geometric center to the point of said maximum flux density.

For the current directions shown in FIG. 4, positive values of $B_H$ are directed to the right, while positive values of $B_V$ are directed upwards.

Figure 5:
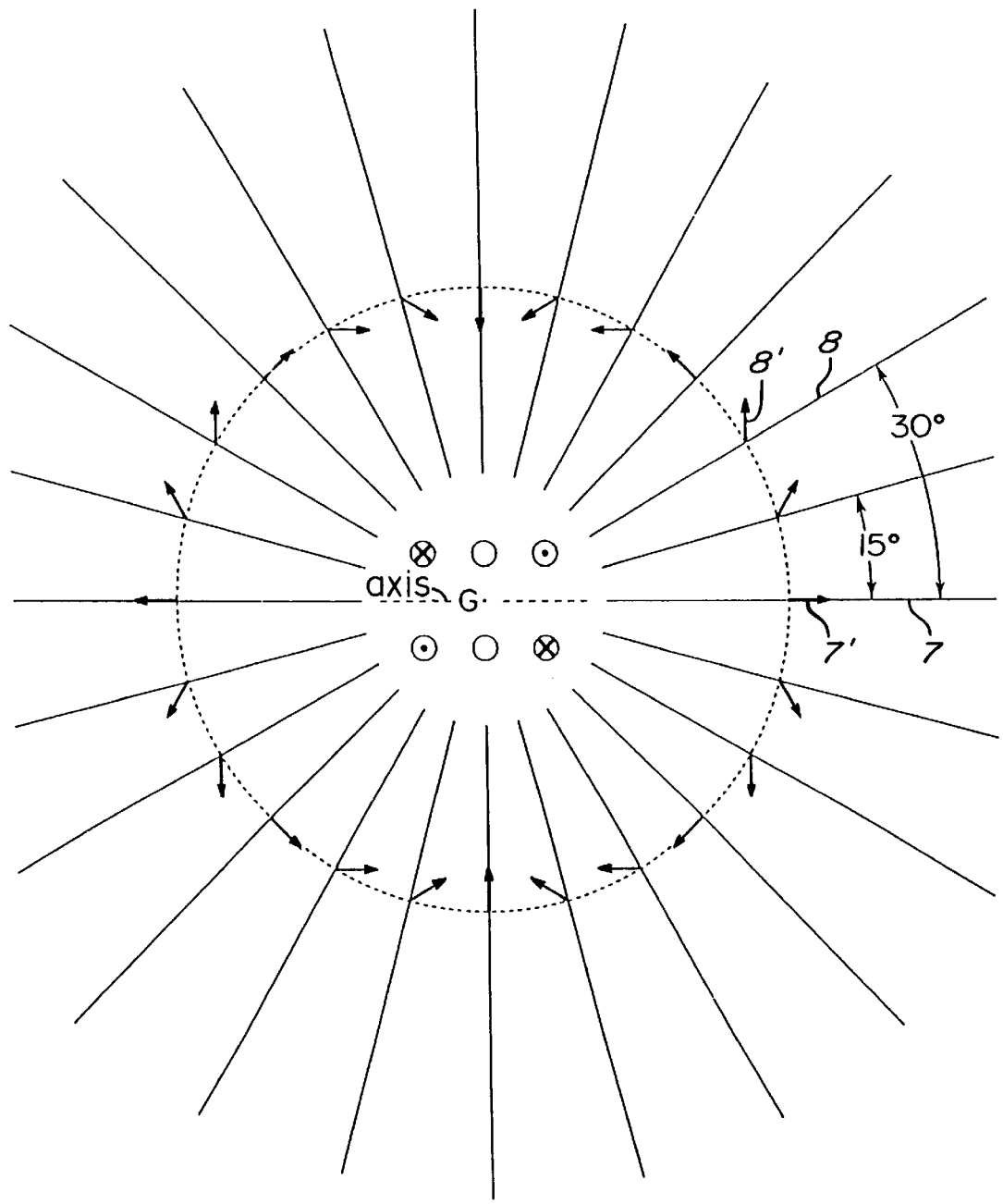
FIG. 5 is a schematic diagram showing the flux density pattern surrounding a 3-phase wye cable when the flux density is maximum.

FIG. 5, based on Eqs. (7), (8) and (9), shows in greater detail the nature of the flux density pattern surrounding the 3-phase wye cable when the flux density is maximum. A set of hypothetical rays, centered at G and spaced at intervals of 15°, are superposed on the six-wire cable. The flux orientation associated with each ray is shown by an arrow. Thus, for the horizontal ray 7, directed along the horizontal axis of the cable, the flux density vector 7' is directed to the right.

On the other hand, for every point along ray 8, oriented at 30° to the horizontal axis, the flux density vector 8' is directed vertically upwards. The reason is that $B_V$=B sin 3×30°=B sin 90°=B, while $B_H$=B cos 3×30°=B cos 90°=0.

Equation (7) reveals that the flux density along each ray decreases inversely as the cube of the distance from the geometric center G. The flux density along any ray decreases therefore very rapidly with increasing values of x, but for any given ray its orientation with respect to the horizontal axis of the cable remains the same. The magnitude of the flux density also depends linearly upon the spacings d and h between the wires and rows; the closer the spacing the lower the flux density.

Although Eq. (7) is approximate, I have found that if x is both greater than 10 h and greater than 10 d, the calculated value of B is accurate to better than ±2%. For example, if $I_{Y3}$=23 A, and d=4 mm, h=5 mm and x=60 mm, the value of B, to an accuracy of better than ±2% is:

$$B = \frac{4\sqrt{3} I_{Y3} h d}{x^3}$$

$$= \frac{4\sqrt{3} \times 23 \times 0.005 \times 0.004}{0.06^3} = 14.7 \text{ mG} \quad \text{Eq. 7}$$

I have also found that the accuracy of Eq. (7) is better than ±5% when x is both greater than 5 h and greater than 5 d.

The configuration of the wires and the direction of current flows as shown in FIGS. 2 and 4 are crucial to obtaining the results expressed by Eq. (7). For example, in FIG. 2a, if the connections of the loop formed by wires 3 and 4 are interchanged, the resulting flux density patterns become vastly different and the flux densities become much larger.

Figure 6B:
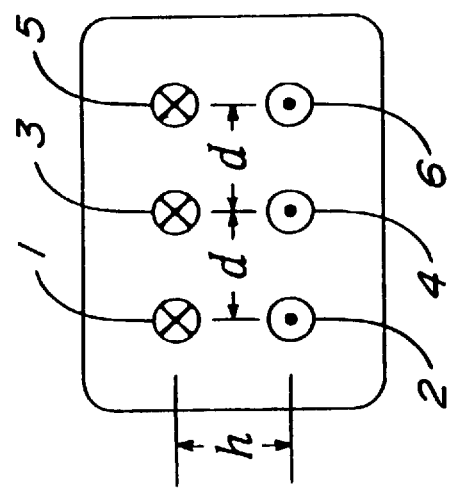
FIG. 6b shows its cross section and wire configuration.

FIG. 6 is a schematic diagram of a cable that is identical to the wye cable shown in FIG. 2, except that the six wires are connected in delta and the cable length $L_2$ is typically greater than cable length $L_1$. For purposes of ready identification, I call this a delta cable. FIG. 6b is a cross section of the delta cable.

Figure 6A:
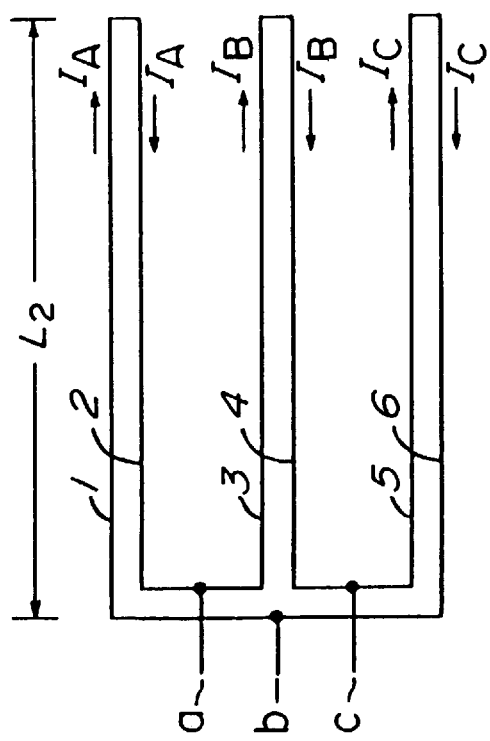
FIG. 6a is a schematic diagram showing a six-wire delta cable.

Let us assume that the currents flowing in the six wires of FIG. 6a are identical to those shown in FIG. 2a. Consequently, the flux patterns are also identical, and therefore Eqs. (7), (8) and (9) can be used to determine the maximum flux density around a delta cable.

In effect, because the wire currents are assumed to be identical in both cables, the peak line currents flowing in leads a,b,c of the delta cable in FIG. 6a are √3 times larger than those in the wye cable of FIG. 2a, a relationship that is well known in 3-phase circuits. The flux density for a delta cable is therefore given by:

$$B = \frac{4 I_{D3} h d}{x^3} \quad (10)$$

wherein the symbols B, h, d, x have the same meaning as in Eq. (7) and $I_{D3}$ is the peak line current per phase. The subscripts D and 3 in $I_{D3}$ stand for delta cable and 3-phase source, respectively.

The horizontal and vertical components of B for a delta cable are again given by Eqs (8) and (9), respectively.

DESCRIPTION OF HEATING SYSTEM

Figure 7:
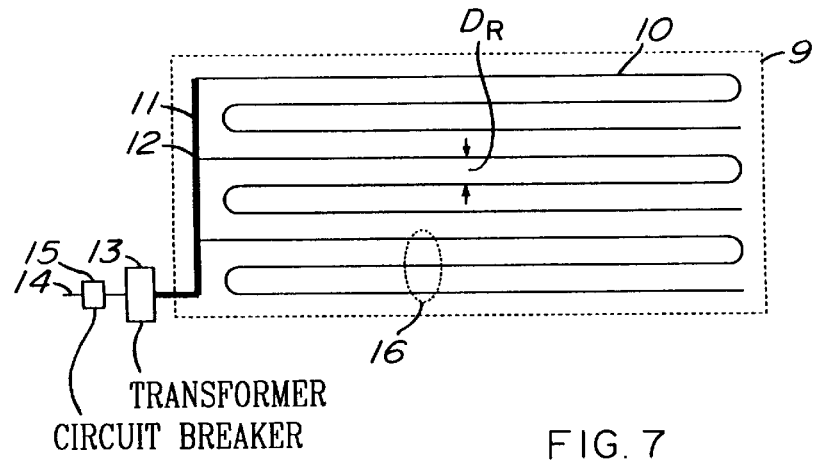
FIG. 7 is a schematic diagram showing the essential elements of the extra-low-voltage heating system covered by the present invention.

FIG. 7 reveals the basic elements of the extra-low-voltage heating system covered by this invention. A surface area 9 is heated by means of a plurality of three-phase cables 10 that are connected to a three-phase feeder 11 by means of connections 12. The feeder is powered by a three-phase stepdown transformer 13 that is connected on its primary side to a 3-phase supply line 14 by means of circuit-breaker 15. The secondary line-to-line voltage is 30 V or less, to keep the system in the extra-low-voltage class.

As previously described, each heating cable 10 consists of six insulated wires that are in close proximity to each other. The cables develop a thermal power of $P_C$ watts per unit length. The value of $P_C$ depends upon several factors, such as the feeder voltage, the wire size, the length of cable and the resistivity of the wire material. For a given voltage, wire size and wire material, the cable lengths are set so that the resulting value of PC maintains the temperature of the wires at or below the rated temperature of the cable. The rated temperature is typically less than 90° C.

The sinuous cable runs are spaced at such a distance $D_R$ from each other so as to develop the desired thermal power density $P_D$. In FIG. 7, each cable makes three runs, labeled 16. The value of $D_R$ is given by:

$$D_R = P_C / P_D \quad (11)$$

in which
$D_R$=distance between cable runs [m]
$P_C$=thermal power per unit length [W/m]
$P_D$=thermal power density [W/m²]

The voltage along the length of the feeder 11 is essentially constant and equal to 30 V or less. The feeder is made of flat copper bars insulated from each other, and specially configured to reduce the magnetic field produced by the feeder. The feeder current at the transformer terminals is equal to the sum of the currents drawn by the cables. It is clear that the current in the feeder decreases progressively from a maximum at the transformer terminals to zero at the far end of the feeder. Consequently, the magnetic flux density surrounding the feeder reaches its greatest value near the transformer.

Figure 8:
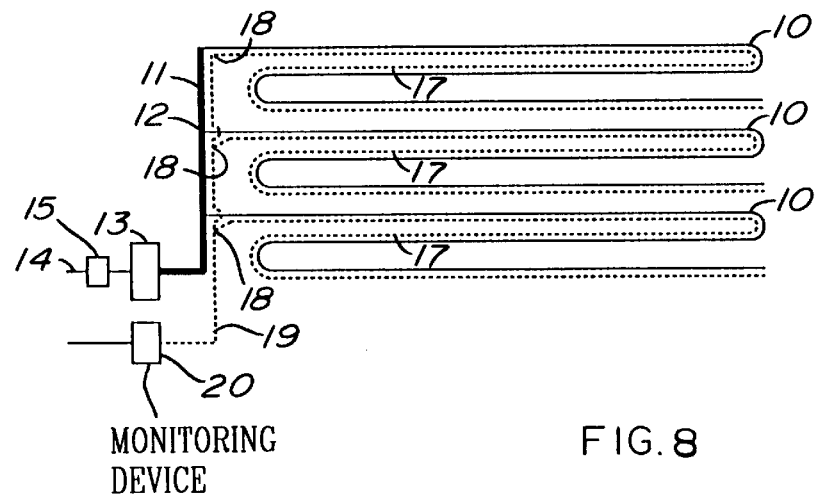
FIG. 8 is a schematic diagram showing the monitoring system that checks the integrity of the extra-low-voltage heating system.

FIG. 8 is another embodiment of the heating system of the present invention wherein a monitoring network is added. In this network, each heating cable contains, in addition to its heating wires, a bare metallic sensing wire or braid 17. Each sensing wire is connected at point 18 to a single insulated conductor 19 that follows the general direction of the feeder and terminates at a monitoring device 20. This low-power device applies a voltage between the sensing wires and the respective heating wires of the cables. If for any reason the insulation between a sensing wire and the heating wires of a cable should become damaged, a small current will flow, causing the monitoring device to trip circuit breaker 15. As a result, the heating system will be shut down. The nature of this monitoring device will be explained later in this disclosure.

Figure 9:
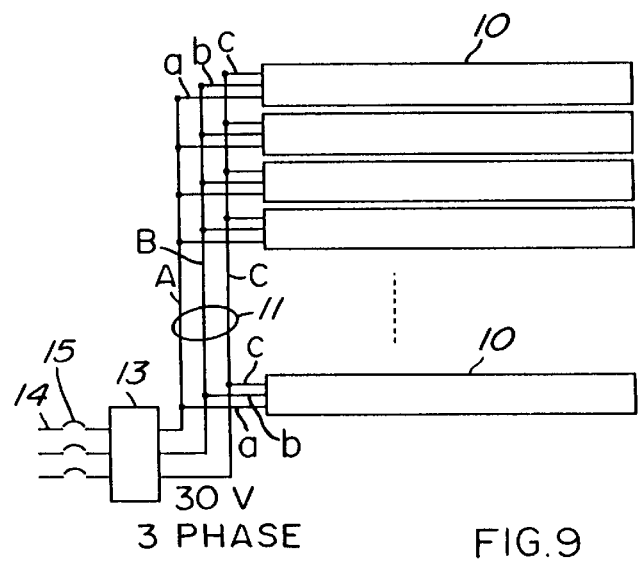
FIG. 9 is a schematic diagram showing in greater detail the cables and feeder of a 3-phase extra-low-voltage heating system wherein the feeder is composed of three busbars and the monitoring system is not shown.

FIG. 9 shows in greater detail the method of connecting the cables to a conventional 3-phase feeder having three busbars A, B, C. In this Figure, the cables have a single run. The three leads a, b, c of each cable are connected to the busbars A, B, C. Care is taken to make all connections the same. Towards this end, the cable leads a, b, c must be marked (such as by color coding), to ensure that the correct leads are connected to the respective busbars. Correct lead connections are required so that the resulting cable configuration will minimize the flux density in certain regions above the heated surface.

Cable Configuration

In this 3-phase heating system, correct cable configuration means that the cable runs are laid flat so that the axes of the cables are coplanar and lie substantially parallel to the plane of the surface to be heated. Furthermore, the cable leads a, b, c are respectively connected to phases A, B, C of the feeder. Under these controlled conditions, the flux density at a given point perpendicular to the heated surface can be calculated. In effect, in the case of a wye cable, knowing the spacing $D_R$ between the cable runs and applying Eqs. (7), (8), (9) to each run, the respective horizontal and vertical components of flux density can be summed, and so the resultant flux density at the given point can be found. In general, for a given perpendicular distance from the plane of the heated surface, the flux density tends to be greatest immediately above the cable runs.

Figure 10:
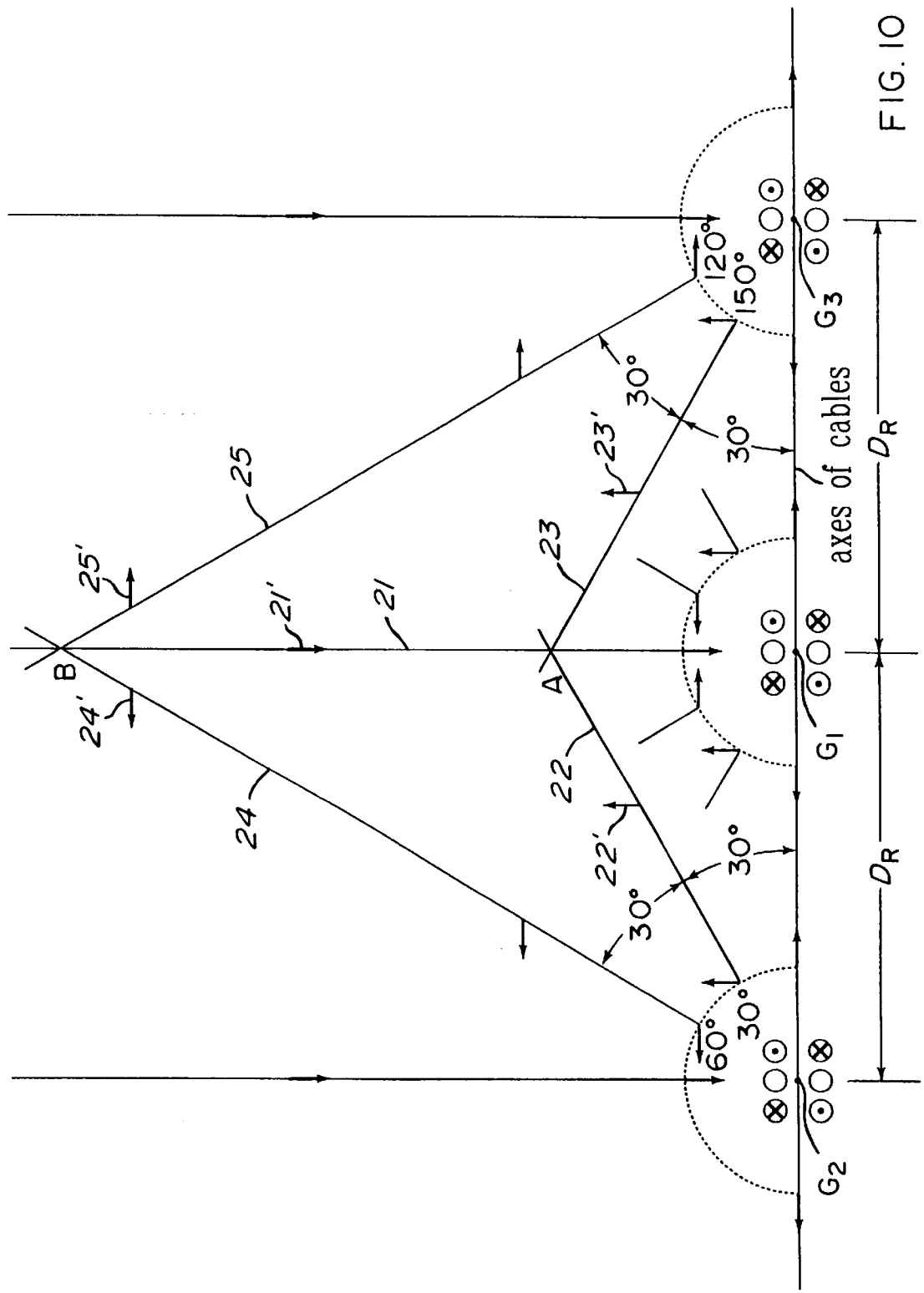
FIG. 10 is a schematic diagram showing the cross section and configuration of three adjacent 3-phase cable runs laid out on a flat surface, together with the flux density patterns at the moment when the flux densities are maximum.

To visualize the resultant flux density pattern, it is helpful to examine the simple model of FIG. 10. It shows the flux density patterns of three adjacent cable runs $G_1$, $G_2$, $G_3$ having geometric centers that are also labeled $G_1$, $G_2$, $G_3$. The runs carry identical currents in correspondingly-located wires, and the instant is selected when the flux density is maximum. Consequently, the flux density pattern for each cable is the same as that previously illustrated in FIGS. 4 and 5.

We want to picture the resultant flux densities for heights H immediately above geometric center $G_1$, and perpendicular to the horizontal axes of the cables. Hypothetical rays fan out at 30° intervals from the geometric centers of cables $G_2$, $G_3$. For distances immediately above cable $G_1$, the 30° ray 22 and 150° ray 23 intersect at point A, while the 60° and 120° rays 24 and 25 intersect at point B. As regards cable $G_1$, the vertical ray 21 is the one we have to consider. It is associated with a flux density vector 21' that acts downwards, as previously seen in FIG. 5.

Consider first rays 22 and 23 that intersect at point A. They are respectively associated with flux density vectors (such as 22' and 23') that act upward. Consequently, at the point of intersection A, these flux densities act in opposition to the downward flux density produced by $G_1$. It follows that the net flux density at point A is less than if cable run $G_1$ acted alone.

Next, turning our attention to rays 24 and 25 at point B, they are associated with flux density vectors (such as vectors 24' and 25') that are horizontal, equal and opposite. Consequently, at point B, these opposing flux densities cancel out and so the resultant flux density is equal to that produced by cable $G_1$ alone. Thus, for all points below point B, the flux density is less than that produced by cable $G_1$ alone. The reason is that any two rays emanating from $G_2$ and $G_3$ that intersect along the vertical line below point B are associated with flux densities that have a vertical component that is directed upwards (thereby opposing the flux density vector 21'), while the respective horizontal components cancel out. This can be seen by observing the orientation of the flux density vectors displayed in FIG. 5.

Consequently, the cable configuration shown in FIG. 10 is advantageous because it tends to reduce the flux density near the heated surface where the flux density tends to be large. Note that distance $BG_1$ is equal to $D_R\sqrt{3}$ which corresponds to a height H of about 1.7 $D_R$.

On the other hand, the flux density above point B is larger than that produced by cable $G_1$ alone. The reason is that when the rays from $G_2$ and $G_3$ are steeper than 60°, they contain a vertical component that acts downwards, in the same direction as the flux density produced by cable $G_1$. However, this is not a serious drawback because the flux densities at distances exceeding 1.7 $D_R$ are very small.

It can be seen that if cable run $G_1$ is surrounded by several cable runs on either side, the flux density is reduced still more, even for heights H greater than 1.7 $D_R$. However, for low heights very close to cable $G_1$, the reduction in flux density becomes relatively small because the distances to surrounding cable runs become relatively much larger.

If cable run $G_1$ is at the edge of a heated surface (say the left-hand edge), the cable runs to the left are absent. The reduction in flux density is then not as great as that, say, in the middle of the heated surface.

In conclusion, except near the edges of a heated surface, the flux density at heights H less than 1.7 $D_R$ above the plane of the cables is substantially less than that due to one cable alone. The physical configuration of the wye or delta cables as described above is therefore an important factor in reducing the flux density above a heated surface that is powered by a 3-phase source.

Magnetic Field Produced by the Feeder

Figure 11:
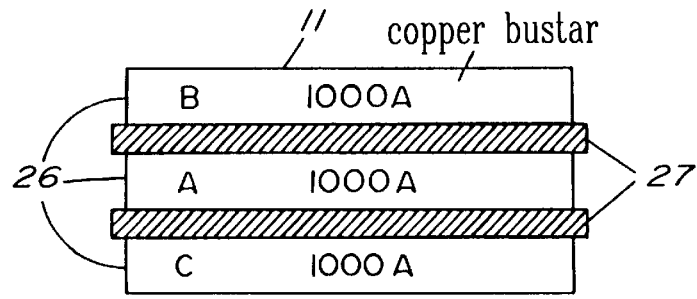
FIG. 11 is a cross section view of a 3-phase feeder of the prior art.

FIG. 9 shows a heating system wherein a conventional 3-phase feeder 11, composed of three copper busbars, delivers power to a plurality of individual cables 10 distributed along its length. As the current builds up along the length of the feeder, the busbars A, B, C may eventually carry peak currents of as much as 1000 A. This creates a problem as far as the magnetic field surrounding the feeder is concerned. The feeder 11 is usually composed of three busbars, traditionally stacked as shown in FIG. 11, which is a cross section view. Two thin strips of insulation 27 separate the respective busbars 26.

In this Figure, for purposes of illustration, suppose each copper bar is 48 mm (2 in) wide and 12 mm (0.5 in) thick, separated by an insulating strip of 3 mm. Such a feeder can carry an RMS (root mean square) current of about 1000 A, per phase. When the peak 3-phase current delivered by the transformer is 1000 A, the feeder produces the approximate peak flux densities shown in Table 2, wherein the values were obtained by computer simulation. Distances are measured from the geometric center of the feeder.

Figure 12:
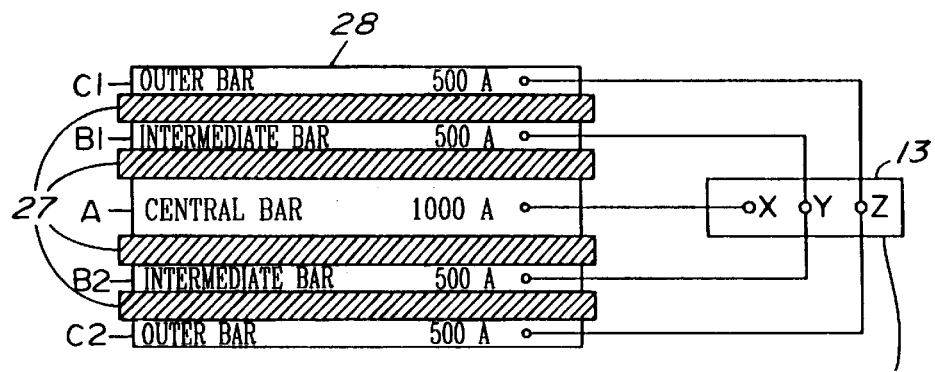
FIG. 12 is a cross section view of a special 3-phase five-bar feeder that is part of this invention.

These flux densities are too high if television screens are located closer than about 40 inches from the transformer end of the feeder. For this reason, a special feeder, producing a lower flux density, is desirable for this extra-low-voltage heating system. FIG. 12 shows a cross section view of this special feeder 28, which has five copper bars instead of three. In effect, the current formerly carried by busbar B is now carried by two intermediate bars B1, B2 having half the thickness of the original busbar.

TABLE 2

Three busbar configuration

| distance from feeder | | flux density |
|---|---|---|
| mm | inches | milligauss |
| 100 | 4 | 5400 |
| 250 | 10 | 840 |
| 500 | 20 | 210 |
| 1000 | 40 | 52 |

Similarly, the current of busbar C is now carried by two outer bars C1, C2, also having half the thickness of the original busbar. Furthermore, the copper bars are stacked in a special way, as shown in FIG. 12. The intermediate bars B1, B2 are respectively sandwiched between the outer bars C1, C2 and the central bar A.

Figure 13:
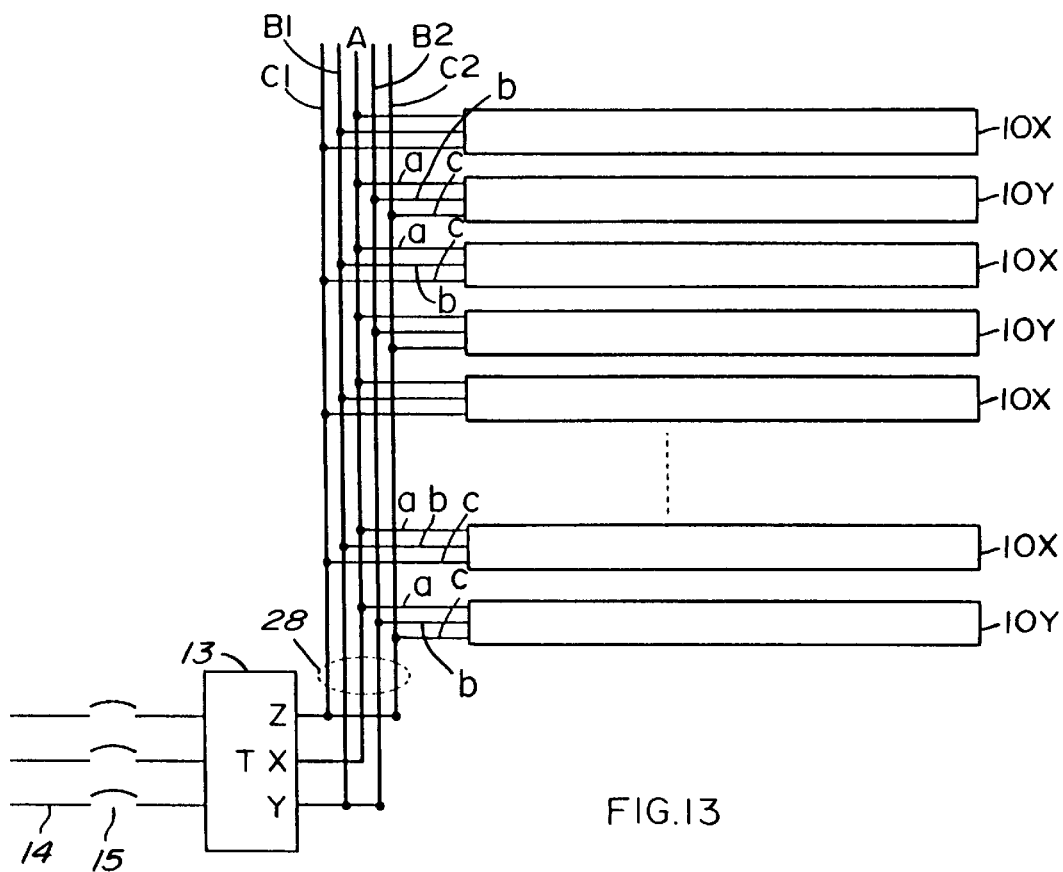
FIG. 13 is a schematic diagram of a 3-phase heating system using a five-bar feeder, and showing the method of connecting the heating cables thereto.

FIG. 13 shows that at one end of the feeder, bars B1, B2 are connected to terminal Y of transformer 13, bars C1, C2 are connected to terminal Z, and bar A is connected to terminal X. This five-bar configuration produces the flux densities shown in Table 3, when the peak 3-phase current delivered by the transformer is again 1000 A.

TABLE 3

Five-bar configuration

| Distance from feeder | | Flux density |
|---|---|---|
| mm | inches | milligauss |
| 100 | 4 | 800 |
| 250 | 10 | 50 |
| 500 | 20 | 6 |
| 1000 | 40 | 1 |

As compared to Table 2, it is evident that this configuration reduces the flux density to an acceptable value for TV screens that are 10 inches away from the feeder. However, to obtain this result, the RMS currents carried by each of the intermediate bars must be equal to the RMS currents carried by each of the outer bars, which in turn must be equal to one-half the RMS current carried by the central bar. Ideally, this condition should be met at every given point along the length of the feeder, in order to minimize the flux density surrounding the feeder at that point.

To approach this ideal condition, FIG. 13 shows how the heating cables are connected to the five-bar feeder 28. Cable 10X is connected to bars A, B1, C1 and the adjacent cable 10Y is connected to bars A, B2, C2. The successive cables, each of which draws substantially the same current from the feeder, are therefore alternately connected to these bars. This ensures substantially equal RMS currents in bars B1, B2, C1, C2, at any given point along the feeder.

The present invention also includes the special feeder as part of the extra-low-voltage heating system.

Monitoring the Integrity of the Heating System

Figure 14:
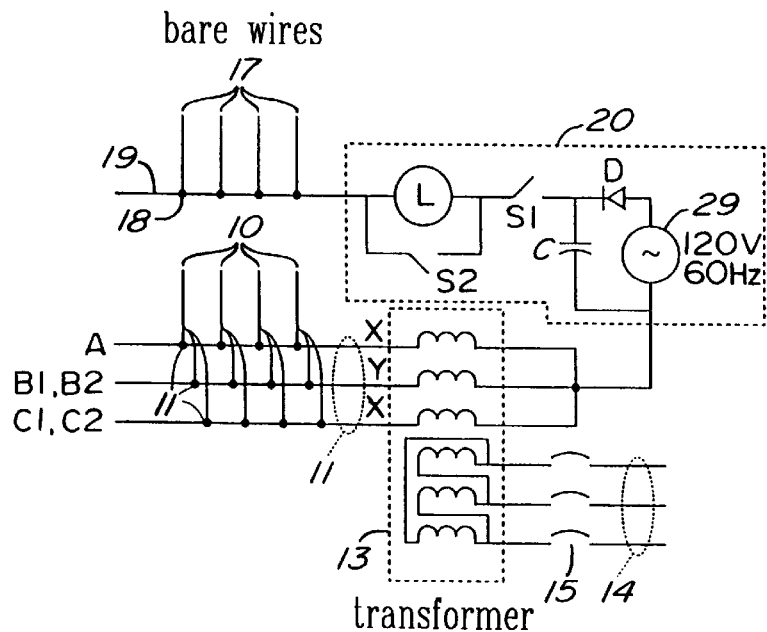
FIG. 14 is a schematic diagram of of one embodiment of the monitoring system.

FIG. 8 illustrates the essential elements of a monitoring system. FIG. 14 shows one embodiment whereby the bare sensing wires 17 running along the length of each heating cable can be used to detect the integrity of the 3-phase heating system. The bare wires 17 are connected to a single insulated conductor 19 which follows the main feeder 11 back to the monitoring device 20. The latter consists of switches S1 and S2, a lamp L, a diode D, a capacitor C and a dedicated ac source 29.

The heating wires and the bare sensing wire of each cable are contained within a plastic sheath. The sensing wire is therefore in close proximity to the heating wires. Consequently, if a cable is damaged, such as may happen if a hole is pierced in a floor, a contact will be established between the bare wire and at least one of the heating wires.

In one embodiment of the monitoring device 20, a 120 V, 60 Hz ac source 29 charges a capacitor C to a potential of about 170 V dc by means of a diode D. A lamp L is connected in series with an electronic switch S1 that closes repeatedly at intervals, say, of once per second. If the heating system is intact, the periodic application of 170 V dc between the bare wires and the heating wires will have no effect and the lamp will not light up. But if a fault or short-circuit occurs between a bare wire and any one of the heating wires in the cable, the lamp will blink repeatedly at a rate of once per second, as the capacitor discharges through the lamp into the short circuit. By an auxiliary circuit means (not shown), this action will cause circuit breaker 15 on the primary side of the transformer to trip, thus removing power from the defective heating system. Because the monitor is powered by a dedicated supply, the lamp will continue to blink, thus alerting the existence of a faulty cable.

To locate the fault, the lamp is short-circuited by means of switch S2, a procedure that greatly increases the capacitor discharge current through the fault. The resulting pulsating magnetic field created around the insulated conductor 19 and around the defective cable, can be detected by a portable magnetic pick-up. By following the path of the pulsating magnetic field, the exact location of the fault can be determined.

It is understood that many other means, utilizing the sensing wire concept, can be devised to monitor a heating system, and to determine the location of a fault.

Single-Phase Cable Configuration

Figure 15A:
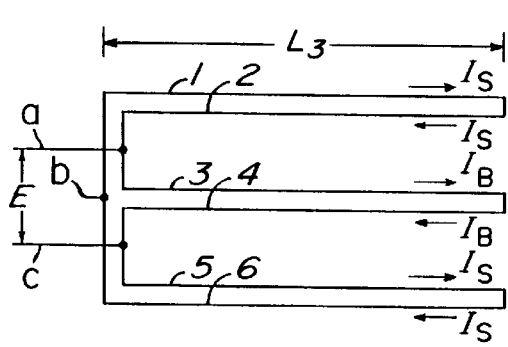
FIG. 15a is a schematic diagram of a delta cable showing its mode of connection to a single-phase source.

Some heating systems are powered by a single-phase source. In such cases, the six-wire delta cable used in 3-phase systems can be connected so that the accompanying magnetic field is particularly low. The preferred single-phase connection of a delta cable is shown in FIG. 15a. The single-phase source is connected to cable leads a and c, while lead b is left open. As a result, the two inner wires 3 and 4 remain connected in series between cable terminals a, c. However, the four outer wires 1, 2, 5, and 6 are now effectively connected in series between the same terminals.

Figure 15B:
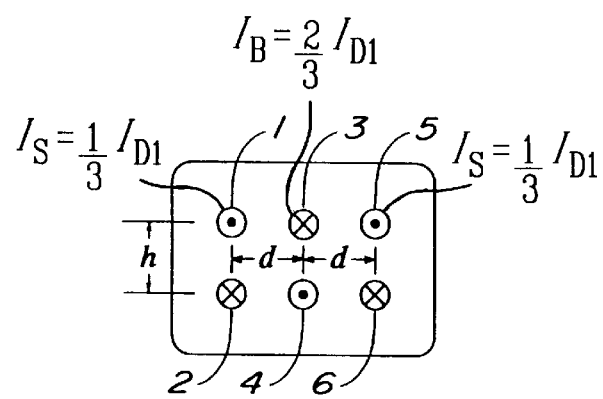
FIG. 15b is a cross section view of a single-phase delta cable, showing the magnitude and direction of current flow in the wires at the moment when the flux density surrounding the cable is maximum.

The arbitrary positive directions of currents $I_B$ and $I_S$ that flow in the wires are shown in FIG. 15a. The wires have the same cross section; consequently $I_B$ is twice as large as $I_S$. Both currents attain their respective maximum values at the same time. As a result, the peak flux density is attained when the currents reach their maximum positive (or negative) values. The actual direction and magnitude of the respective currents at one moment of maximum flux density are shown in FIG. 15b. Thus, the currents in conductors 2, 3 and 6 flow into the page, while the currents in conductors 1, 4, and 5 flow out of the page. Furthermore, the currents in the inner wires 3 and 4 are double those in the outer wires 1, 2, 5, 6. Consequently, the peak value of $I_B = \frac{2}{3} I_{D1}$, where $I_{D1}$ is the peak current drawn from the single-phase line, flowing in leads a, c. The subscripts D and 1 in $I_{D1}$ respectively stand for delta cable and 1-phase source.

Figure 16:
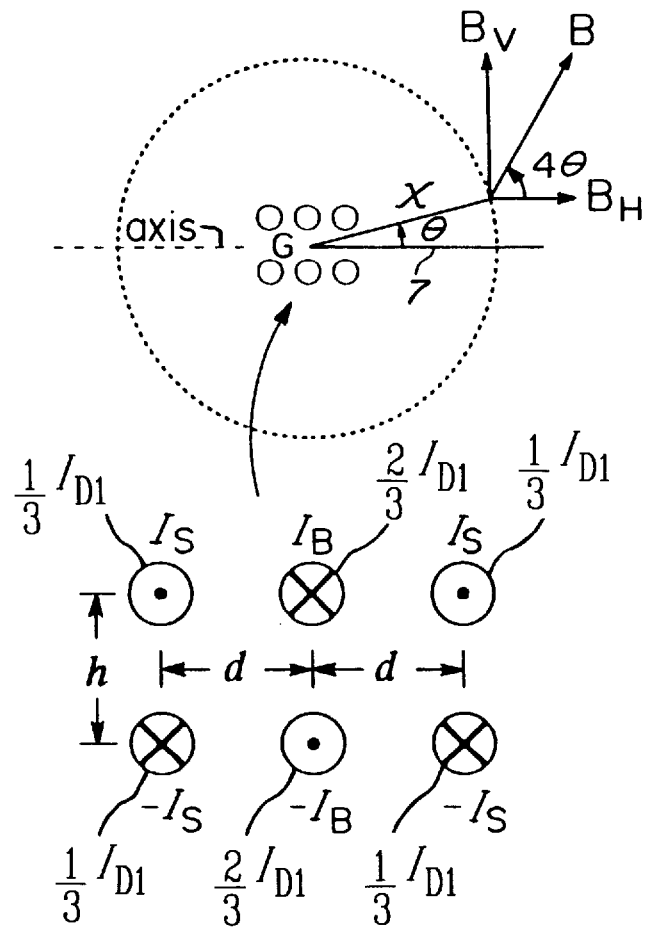
FIG. 16 is a cross section view of a delta cable when connected to a single-phase source, showing the magnitude and direction of current flows in the wires and the resulting components of flux density at the moment when the flux density surrounding the cable is maximum.

An expression was derived that gives the flux density surrounding the delta cable at this particular moment of peak flux density. Referring to FIG. 16, ray 7 lies on the horizontal axis of the cable, extending to the right from the geometric center G of the six wires. Consider now a ray of length x, inclined at an angle θ to the horizontal axis. I have found that the maximum flux density at this distance x is given by the approximate formula:

$$B = \frac{4 I_{D1} h d^2}{x^4} \quad (12)$$

This formula is accurate to better than ±5% provided x is both greater than 5h and greater than 5d.

The approximate horizontal and vertical components of this flux density are respectively:

$$B_H = B \cos 4\theta \quad (13)$$

$$B_V = B \sin 4\theta \quad (14)$$

where

B=maximum flux density [mG];
$I_{D1}$=peak line current drawn by the single-phase delta cable [A]
h=space between the rows [m]
d=space between adjacent wires in the rows [m]
x=radial distance from the geometric center of the cable [m]
θ=angle between the horizontal axis of the cable and the ray joining its geometric center to the point of said maximum flux density.

For the current directions shown in FIG. 16, positive values of $B_H$ are directed to the right, while positive values of $B_V$ are directed upwards.

Figure 17:
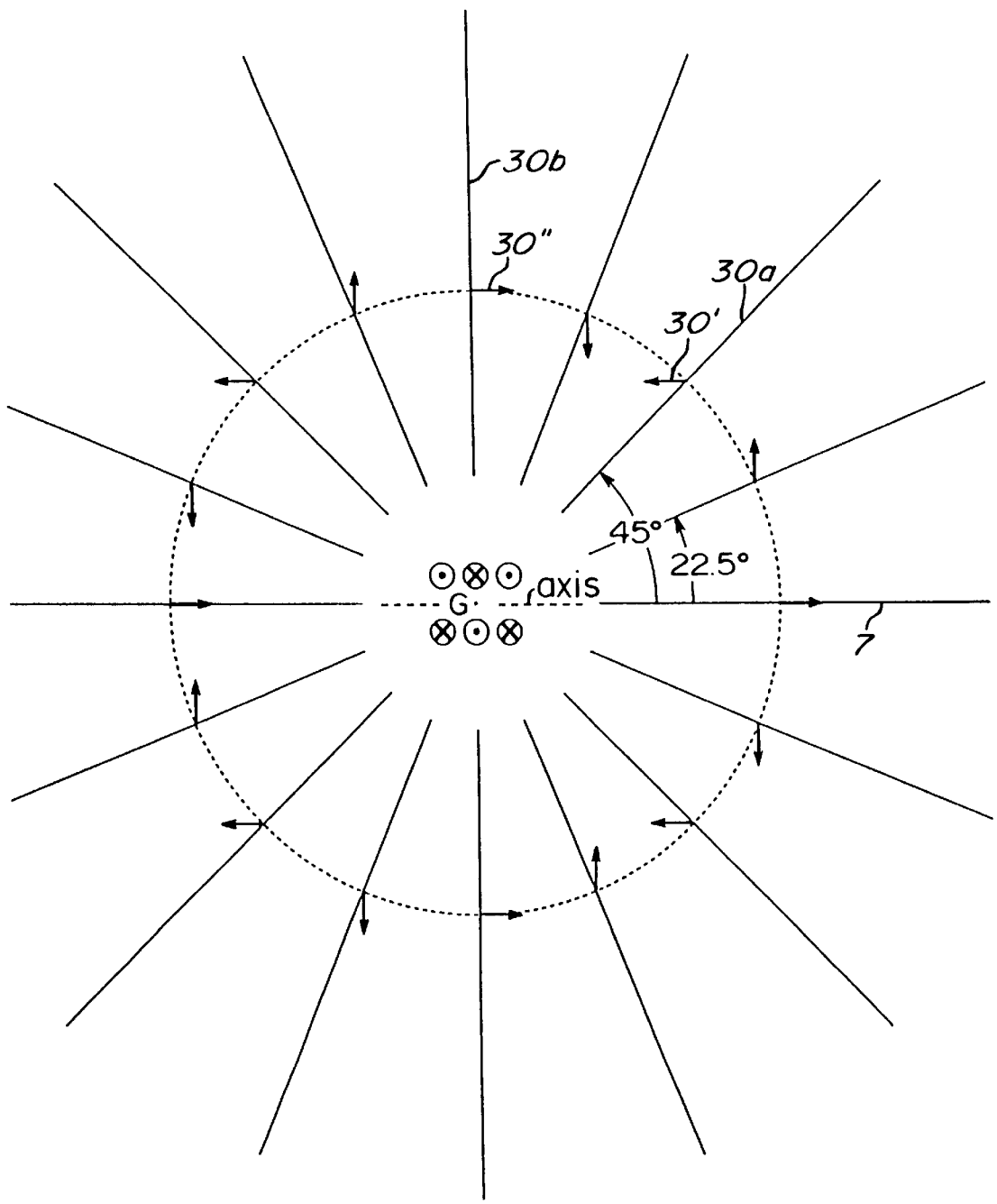
FIG. 17 is a schematic drawing showing the flux density pattern surrounding a delta cable when connected to a single-phase source.

FIG. 17 shows in greater detail the nature of the flux pattern surrounding the cable. A set of hypothetical rays, centered at G and spaced at intervals of 22.5°, are superposed on the six-wire cable. The flux density orientation associated with each ray is shown by an arrow. Consider, for example, ray 30a that is inclined at 45° to the horizontal axis. The horizontal component $B_H$ associated with this ray is $B_H = B \cos 4 \times 45° = B \cos 180° = -B$, directed to the left. On the other hand, the vertical component $B_V = B \sin 4 \times 45° = B \sin 180° = 0$. Thus, the flux density vectors at every point along ray 30a are directed horizontally to the left, as indicated by representative flux density vector 30'. By a similar reasoning, the representative flux density vector 30" is directed horizontally to the right at every point along ray 30b, because this ray is inclined at 90° to the horizontal axis.

Equation (12) reveals that the flux density decreases inversely as the fourth power of the distance from the geometric center G. Thus, the flux density decreases very rapidly with increasing x. The magnitude of the flux density also depends upon the spacings d and h between the wires and rows; the closer the spacing the lower the flux density. To obtain the results predicted by Eqs. (12), (13) and (14) it is essential that the wires (and the currents they carry) be configured, as described above.

Single-Phase Wye Cable

Referring to FIG. 2a, the wye cable can also be connected to a single-phase source by short-circuiting terminals a, c and applying a single-phase voltage between terminals a and b. The resulting flux density pattern is similar to that of a delta cable connected to a single phase source. Indeed, the flux density patterns are identical when the line current of the wye cable is arranged to be $\frac{2}{3}$ that of the delta cable.

Configuration of Cables in Single-Phase Circuits

Figure 18:
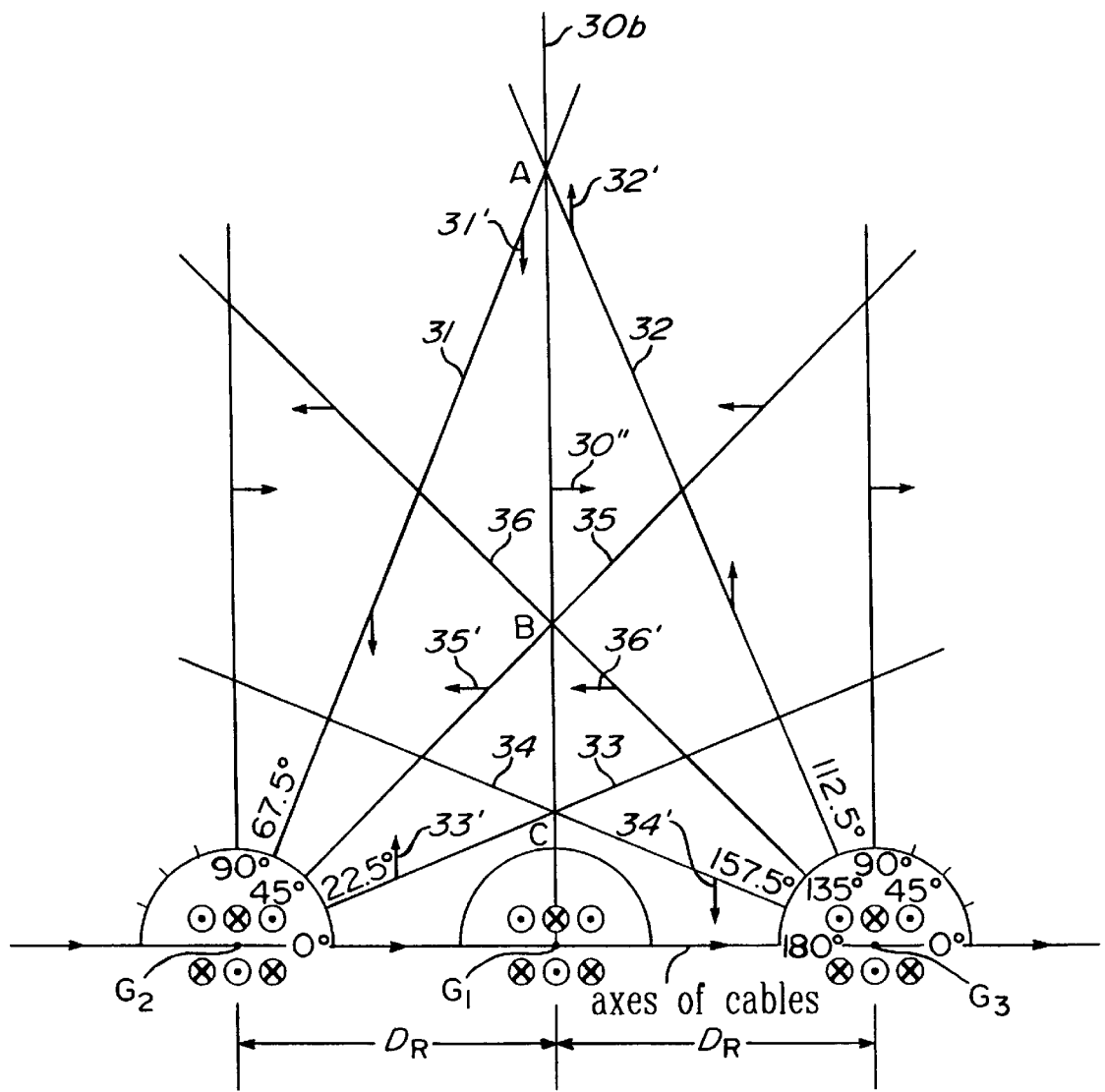
FIG. 18 is a schematic diagram showing in cross section the configuration of three adjacent delta cable runs, laid out on a flat surface, when delta cables are connected to a single-phase source, together with several representative flux density patterns.

FIG. 18 shows, in cross section, three adjacent cable runs $G_1$, $G_2$, $G_3$, whose geometric centers are also labeled $G_1$, $G_2$, $G_3$. The cable runs are laid out on a flat surface and spaced at a distance $D_R$. The cables are powered by a single-phase source and their flux density patterns are similar to the pattern illustrated in FIGS. 16 and 17. In effect, the cables are laid out flat and configured in such a way that their axes are coplanar and lie parallel to the plane of the heated surface, as shown in FIG. 18. Furthermore, the cables are arranged so that the magnitudes and directions of current flows in correspondingly-located wires of successive cable runs are substantially the same.

In order to visualize the nature of the resulting magnetic field, we assume that rays, spaced at 22.5° intervals, fan out from the respective geometric centers $G_2$, $G_3$. Let us examine the resultant flux densities immediately above cable $G_1$. We recall that the vertical ray 30b emanating from $G_1$ is associated with flux density vectors that are directed horizontally to the right, as exemplified by flux density vector 30".

Consider first the rays 31 and 32, respectively inclined at 67.5° and 112.5° to the horizontal, that intersect at point A. Their associated magnetic fields act vertically, but in opposite directions, as illustrated by vectors 31' and 32'. At point A, the flux densities are equal in magnitude (and therefore cancel out) because the distances $AG_2$ and $AG_3$ are the same. Consequently, the resultant flux density at point A is that due to cable $G_1$ alone. The flux density vector at this point is therefore directed to the right. Point A is at a distance $H = D_R \tan 67.5° = 2.4 \, D_R$ above the horizontal axes of the cables, and perpendicular thereto.

Next, consider rays 33 and 34, respectively inclined at 22.5° and 157.5°, that intersect at point C. The corresponding flux densities also act vertically and in opposite directions as illustrated by vectors 33' and 34'. Consequently, the resultant flux density at point C is again due to cable $G_1$ alone, also directed to the right. Point C is situated at a distance $H = D_R \tan 22.5° = 0.4 \, D_R$ above the horizontal axes of the cables, and perpendicular thereto.

Finally, consider rays 35 and 36, respectively inclined at 45° and 135° to the horizontal axis, that intersect at point B. Both rays are associated with flux densities that act to the left, in direct opposition to the flux density created by cable $G_1$. These directions are illustrated by vectors 35' and 36'. Consequently, the net flux density at point B is less than that created by cable $G_1$. It is now seen that the flux density at every point along the line between points A and C is less than that produced by $G_1$ alone.

However, in this simple model of FIG. 18, it can be readily shown that the flux densities at every point above point A and below point C will be greater than that due to cable $G_1$ alone. However, this is not a serious drawback, for the following reasons. First, point A is located at a distance of 2.4 $D_R$ above the surface, which is so far away from the cables that the flux density is already very low. Second, points immediately below point C are much closer to $G_1$ than they are to $G_2$ or $G_3$. Consequently, bearing in mind that the flux density decreases as the fourth power of distance, it follows that the contribution of cables $G_2$ and $G_3$ to the total flux density below point C is small. For example, at point C the distance $CG_2$ is 2.6 times the distance $CG_1$. As a result, the flux density created at this point by cable $G_2$ (or $G_3$) is only $1/2.6^4 = 0.022$ or 2.2% of that created by $G_1$.

If cable $G_1$ is surrounded by several cable runs on either side, the resulting flux density will be reduced still more in the general region between points A and C.

It is understood that when several cable runs are involved, a detailed flux density analysis can be made, either by employing Eqs. (12), (13) and (14), or by computer simulation. However, the basic factors that come into play are easier to visualize by referring to FIG. 18.

In conclusion, the single-phase cable configuration of FIG. 18 is a preferred embodiment of this invention because it tends to reduce the flux density in the regions near the heated surface, namely those situated at distances H between 0.4 $D_R$ and 2.4 $D_R$ perpendicular to the horizontal axes of the cables.

Figure 19:
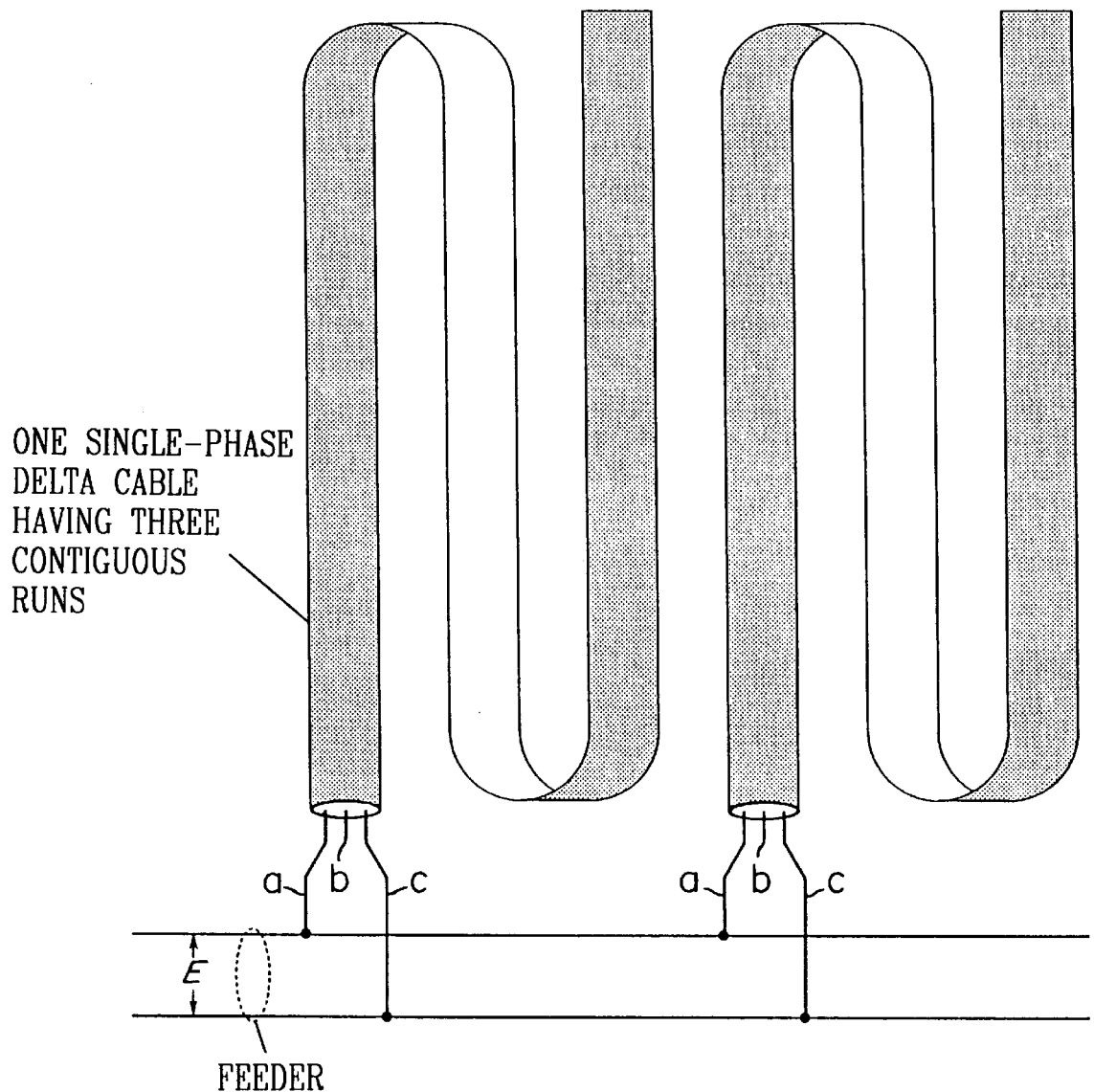
FIG. 19 is a schematic diagram of two delta cables laid out on a flat surface, showing the preferred cable configuration when the cables have more than one run and are connected to a single-phase source.

When a single-phase cable comprises two or more runs, the cables must be twisted at the end of each run to obtain the cable configuration shown in FIG. 18. The required twists are illustrated in FIG. 19 for two adjacent cables, each having three contiguous runs. Note that the said upper rows and lower rows of the contiguous cable runs are alternately interchanged.

Cable Parameters and Characteristics

In addition to low flux densities, the heating cables must meet the requirements listed in the objectives of this invention. Thus, they must be robust, operate at temperatures below 90° C., and be as long as possible in order to reduce the number of cables that have to be connected to the feeder. Another objective is that the cables should be standardized as to wire size, wire material, and wire configuration so that a particular type of cable may be used in different heating installations. In order to meet these objectives and to evaluate the interaction of the various requirements, we postulate the following parameters. They are common to all cable types (wye, delta and single-phase) revealed in this disclosure:

| Parameter | symbol | unit |
|---|---|---|
| Line-to-line operating voltage of heating system: | E | volt [V] |
| Thermal power density of heating system: | $P_D$ | watt per square meter [W/m²] |
| Thermal power per unit length of cable: | $P_C$ | watt per meter [W/m] |
| Length of cable: | L | meter [m] |
| Total cross section of all six wires in the cable: | A | square meter [m²] |
| Resistivity of wire material: | ρ | ohm-meter [Ω.m] |

Using these parameters, the features of the three cable types can be determined and compared. In making the comparison, we assume that the line-to-line operating voltage E, the thermal power per unit length $P_C$, and the total cross section A of the six current-carrying wires is the same for all three types of cables.

We begin our analysis of the 3-phase wye cable illustrated in FIG. 2. We reason as follows:

$$\text{cross section of one wire} = \frac{A}{6}$$

$$\text{length of cable} = L_1$$

$$\text{length of wire for one phase} = 2L_1$$

$$\text{resistance of wire for one phase: } R = \frac{2\rho L_1}{A/6} = \frac{12\rho L_1}{A}$$

$$\text{total heating power of cable} = \frac{E^2}{R} = \frac{E^2 A}{12\rho L_1}$$

$$\text{thermal power per unit length} = \frac{E^2 A}{12\rho L_1^2} = P_C$$

$$\text{length of cable} = L_1 = \frac{E}{\sqrt{12}} \sqrt{\frac{A}{\rho P_C}} = 0.289 E \sqrt{\frac{A}{\rho P_C}}$$

$$RMS \text{ line current} = \frac{P_C L_1}{E\sqrt{3}} = \frac{1}{6}\sqrt{\frac{AP_C}{\rho}} = 0.167 \sqrt{\frac{AP_C}{\rho}}$$

cost per unit length is roughly proportional to A $$\text{spacing } D_R \text{ between cable runs} = \frac{P_C}{P_D}$$

$$\text{Let us define the amperage parameter } I_0 = \sqrt{\frac{AP_C}{\rho}}$$

$$RMS \text{ line current} = 0.167 I_0$$

$$\text{Peak line current } I_{Y3} = \sqrt{2} \; (0.167 I_0) = 0.236 I_0$$

$$\text{Peak flux density} = \frac{4\sqrt{3} I_{Y3} h d}{x^3} = \frac{1.633 I_0 h d}{x^3} = \frac{1.633 h d}{x^3} \sqrt{\frac{AP_C}{\rho}}$$

By following the same procedure, the features of the other cables (FIGS. 6, 15) can be found. The features are listed in Table 4.

We use the amperage parameter $$I_0 = \sqrt{\frac{AP_C}{\rho}}$$

to show with greater clarity the relative magnitudes of the line currents and flux densities.

Choice of of Wire Material and Individual Cable Length

Table 4, row (2), reveals that for all cables, the length of individual cables depends on E, A, $P_C$ and ρ, multiplied by a numerical coefficient that depends upon the type of cable.

To ensure robustness, the total cross section A of all six wires should not be too small. Typical values for surface heating range from 5 mm² to

TABLE 4

| Type of cable | wye | delta | 1-phase (delta) |
|---|---|---|---|
| (1) source | 3-phase | 3-phase | 1-phase |
| (2) length of cable | $0.289\,E\sqrt{\dfrac{A}{\rho P_c}}$ | $0.5\,E\sqrt{\dfrac{A}{\rho P_c}}$ | $0.354\,E\sqrt{\dfrac{A}{\rho P_c}}$ |
| (2) length of cable | $L_1$ | $L_2$ | $L_3$ |
| (3) wires per cable | 6 | 6 | 6 |
| (4) wire cross section | $\dfrac{A}{6}$ | $\dfrac{A}{6}$ | $\dfrac{A}{6}$ |
| (5) RMS line current | $0.167 I_O$ | $0.289 I_O$ | $0.354 I_O$ |
| (6) peak line current | $0.236 I_O$ | $0.409 I_O$ | $0.5 I_O$ |
| (7) peak line current | $I_{Y3}$ | $I_{D3}$ | $I_{D1}$ |
| (8) power per unit length | $P_c$ | $P_c$ | $P_c$ |
| (10) peak flux density | $\dfrac{1.633\,I_0\,h\,d}{x^3}$ | $\dfrac{1.633\,I_0\,h\,d}{x^3}$ | $\dfrac{2\,I_0\,h\,d^2}{x^4}$ |
| (11) Figure | FIG. 2 | FIG. 6 | FIG. 15 |

Note: $I_0 = \sqrt{\dfrac{A\,P_c}{\rho}}$ 10 mm². However, for special applications, smaller or larger values can be employed. The voltage E is low, being 30 V or less. Consequently, according to the formulas in Table 4, row (2), the cable lengths tend to be short, which is a disadvantage. The question now arises as to the values of $P_C$ and $\rho$ that should be used.

In any given surface-heating project requiring a total power P, the total length of all the heating cables is equal to $P/P_C$. In order to minimize the cost, the total length should be as small as possible, which means that $P_C$ should be as large as possible. However, the value of $P_C$ is limited to a maximum $P_{Cmax}$ that depends upon the maximum allowable temperature of the cable as well as the environmental conditions, such as the ambient temperature and the emplacement of the cables.

For a given cable having six wires and a total wire cross section A there is a corresponding $P_{Cmax}$, as defined above, no matter what conductive material is used for the wires. Thus, given the total cross section A and knowing the value of $P_{Cmax}$ and recognizing that E is limited to 30 V, it follows from the formulas in Table 4, row (2), that to obtain the longest possible individual cable, the resistivity $\rho$ of the material should be as low as possible. Copper has the lowest resistivity of all practical conducting materials and so it is a logical choice. However, aluminum is also a satisfactory choice. Nichrome, the well-known resistive alloy, often used in heating applications, is inappropriate for an extra low-voltage system when long cable lengths are desirable. The reason is its resistivity is about 50 times that of copper.

Table 4 reveals that the delta cable is inherently the longest of the three cable types.

Having chosen the wire material, the total cross section A and using the value of $P_{C\,max}$ to minimize the cost, the length of the individual cables can still be tailored to a desired value by using an appropriate voltage E that is less than 30 V. The ability to tailor the individual cable lengths is important because flat surface-heating systems are preferably composed of runs of equal length, such as shown in FIG. 7.

These findings regarding the appropriate wire material and cable lengths constitute a further aspect of this invention.

The Heating Cable as a System

The foregoing disclosure shows that the extra-low-voltage, low flux density six-wire heating cable, as defined, can be used to heat not only flat surfaces, but indeed any surface. For example, the cable can be used in a single run configuration to heat an object, such as a water pipe. The low voltage and particularly low magnetic field make such a cable attractive in some heat tracing applications. The ability of the cable to be used in either a single-phase or 3-phase configuration is also an advantage.

EXAMPLES AND TEST RESULTS

The following examples and test results illustrate some of the characteristics of the extra-low-voltage heating systems covered by this disclosure.

Example 1

A three-conductor No. 14 AWG gauge cable was embedded in a concrete slab and then subjected to snow-melting conditions. It was discovered that a current of 42 A could be circulated through the wires without exceeding the temperature limit of 60° C. This test corresponds to a thermal power of 50 watts per meter. It is equivalent to a six-wire cable in which the wire size is No. 17 AWG and the current in each wire is 21 A.

As a general rule, our experiments on typical low-voltage systems indicate that $P_C$ can range between 20 W/m and 50 W/m depending upon the type of cable, the ambient temperature and the emplacement of the cable. As regards $P_D$, it ranges from 100 W/m² (10 W/ft²) for room heating to 500 W/m² (50 W/ft²) for snow melting. As result, the cable spacings $D_R$ will typically range from 0.1 m (4 in) to 0.2 m (8 in).

Example 2

It is required to calculate the length of a 3-phase delta cable composed of six copper wires, No. 17 AWG, knowing that the temperature is limited to a maximum of 60° C. The line voltage is 30 V and the desired thermal power $P_C$ is 25

W/m. The resistivity of copper at 60° C. is 20 nΩ.m and the cross section of the individual wires is 1.04 mm².

The length can be found by referring to the delta cable in the third column, row (2) of Table 4:

$$\text{Length} = 0.5E\sqrt{\frac{A}{\rho P_C}}$$

$$= 0.5 \times 30\sqrt{\frac{6 \times 1.04 \times 10^{-6}}{20 \times 10^{-9} \times 25}}$$

$$= 53 \text{ m}(174 \text{ ft})$$

Example 3

Figure 20:
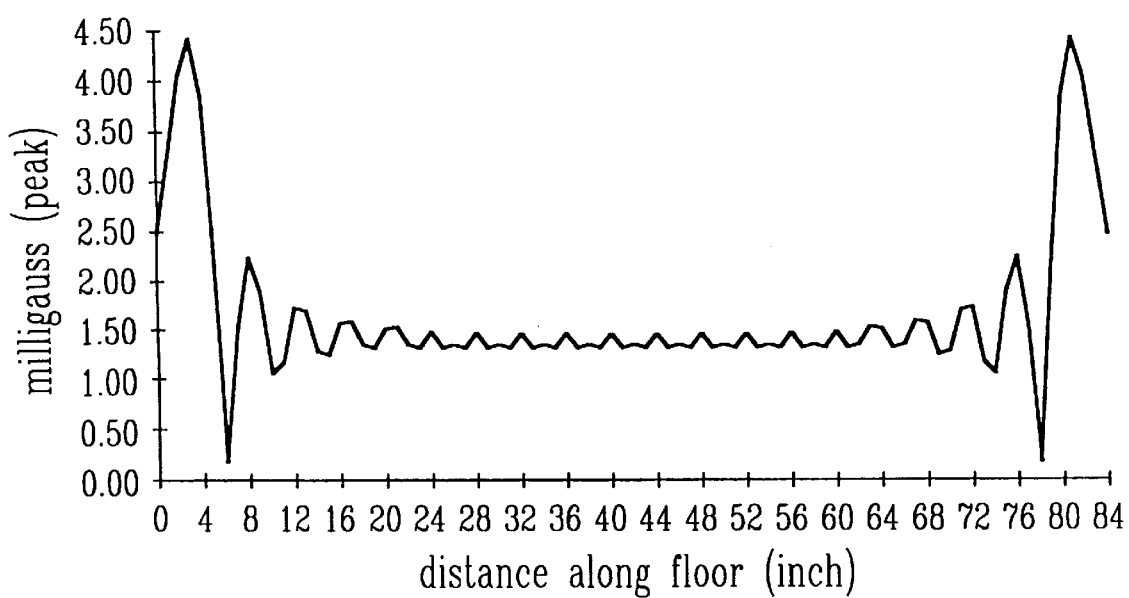
FIG. 20 shows the magnetic flux density distribution above a heated floor when the cables are connected to a 3-phase source.

FIG. 20 shows the flux distribution above a long, narrow floor that is 84 inches wide and heated by twenty cable runs spaced at 4 inch intervals. The first cable run is located 4 inches from the left-hand edge of the floor and the twentieth cable run is 4 inches from the right hand edge. The heating system has the following specifications:

| | |
|---|---|
| Power source | 3-phase, 30 V |
| number of cable runs | 20 |
| type of cable | delta cable |
| RMS line current per cable | 35 A |
| cable specifications: (see FIG. 6b) | h = 6 mm; d = 5 mm |
| spacing $D_R$ between cable runs (FIGS. 7, 10): | 101.6 mm (4 inches) |
| height H above coplanar axes of cables: | 100 mm |

FIG. 20 shows that at a height H of 100 mm (4 in), the flux density is about 1.5 mG over most of the width of the floor and rises to about 4.5 mG at the edges. Also, at this particular height, owing to the interaction of the fields created by neighboring cables, the flux density varies considerably near the edges. The flux distribution was obtained by computer simulation, based on Eq. (1).

By way of comparison, the peak flux density created by a single cable run at a distance of 100 mm from its geometric center can be calculated by using Eq (10). Recognizing that the peak line current is $I_{D3}=35\sqrt{2}=49.5$ A, it is found that the maximum flux density is:

$$B = \frac{4I_{D3}hd}{x^3} \quad \text{Eq. 10}$$

$$= \frac{4 \times 49.5 \times 0.006 \times 0.005}{0.1^3}$$

$$= 5.94 \text{ mG}$$

This individual-cable flux density is four times greater than the 1.5 mG that appears over most of the floor at a height H of 100 mm. Consequently, it is evident that the special configuration of the cables, as postulated in this disclosure, is a very important and beneficial factor in reducing the flux density above a heated floor.

Note that the height of 100 mm falls in the range below the prescribed level $H=1.7\ D_R=1.7\times101.6=173$ mm, wherein the flux density is reduced, as mentioned in the disclosure.

Example 4

Figure 21:
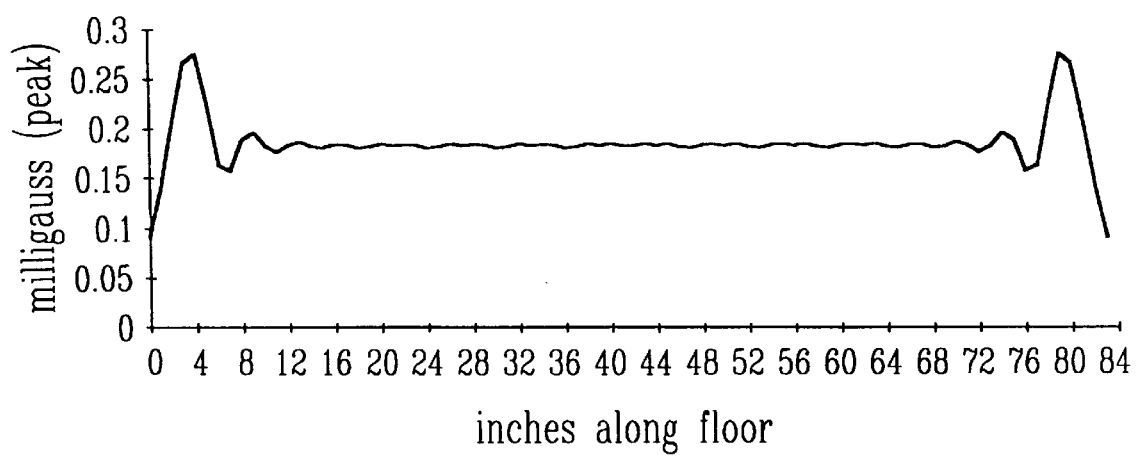
FIG. 21 shows the magnetic flux density distribution above a heated floor when the cables are connected to a single-phase source.

FIG. 21 shows the flux distribution above the same floor as in Example 3 except that the power source is single-phase and the delta cables are connected accordingly, as shown in FIG. 15. To obtain the same power per unit length of cable, the single-phase RMS line current is set at $(0.354/0.289)\times 35=42.9$ A. This result is calculated by referring to the formulas listed in Table 4, row (5). The current is set to 42.9 A by tailoring the length of the cable and, if necessary, by adjusting the line voltage E.

FIG. 21 shows that at a height of 100 mm (4 in), the flux density is about 0.2 mG over most of the width of the floor and rises to about 0.28 mG at the edges. The flux distribution was obtained by computer simulation, based on Eq. (1).

Again by way of comparison, the peak flux density created by a single cable at a distance x of 100 mm from its geometric center can be calculated by using Eq (12). The peak line current is $I_{D1}=42.9\sqrt{2}=60.6$ A, and therefore the flux density is given by Eq. (12):

$$B = \frac{4I_{D3}hd^2}{x^4} \quad \text{Eq. 12}$$

$$= \frac{4 \times 60.6 \times 0.006 \times (0.005)^2}{0.1^4}$$

$$= 0.36 \text{ mG}$$

This individual-cable flux density is 1.8 times greater than the 0.20 mG that appears over most of the floor at a height H of 100 mm. Consequently, the special configuration of the single-phase cables, as postulated in this disclosure, is a beneficial factor in reducing the flux density above a heated floor.

Note that the height of 100 mm falls within the prescribed range, revealed in the disclosure, where the flux density is reduced, namely between $H=0.4\ D_R=0.4\times101.6=41$ mm, and $H=2.4\ D_R=2.4\times101.6=244$ mm.

The single phase mode of operation is particularly effective in reducing the flux density. For example, in comparing it with the 3-phase heating system at the stated height of 100 mm (Example 3), the single-phase system produces a flux density that is 1.5 mG/0.20 mG=7.5 times smaller. It is within the ambit of the present invention to cover any obvious modifications of the examples of the preferred embodiments described herein, provided such fall within the scope of the appended claims.

I claim:

1. A low-voltage heating system for heating a surface area, said system comprising at least one cable having six conductive heating wires contained in an insulated sheath, said six conductive heating wires of said cable being arranged in an upper row of three wires and a lower row of three wires within said cable which is of substantially rectangular cross-section, said upper and lower rows lying parallel to one another and to a horizontal axis of said cable, said rows being in vertical juxtaposition and separated by a distance h, wherein h is the perpendicular distance between said parallel upper and lower rows, an adequate low voltage supply source, feeder conductor means connected to said supply source, said heating wires being connected at one end to said feeder conductor means, said wires having low resistivity similar to that of copper, said at least one cable and said wires therein being permanently fixed relative to said surface area to be heated; said cable having a length (L) based on specific parameters of said system including (i) the operating voltage (E) of said supply source, (ii) the number of phases of said supply sources (iii) the total cross sectional dimension (A) of said six heating wires, (iv) the resistivity (p) of the wire material, (v) the desired thermal power per unit length ($P_C$) of said cable, and (vi) the connection of said wires in said cable to said feeder conductor means, whereby the resultant magnetic flux density of said cable is less than a specific value at a specific distance from a cable when current is applied to said heating wires in said cable.

2. A low-voltage heating system in accordance with claim 1, wherein an outer one of said three wires on a left-hand side of said upper row is separated from an inner one of said three wires of said upper row by a distance d, as measured from a center of said wires.

3. A low-voltage heating system in accordance with claim 2, wherein an outer one of said three wires on a right-hand side of said upper row is separated from an inner one of said three wires of said upper row by a distance d, as measured from a center of said wires.

4. A low-voltage heating system in accordance with claim 3, wherein an outer one of said three wires on a left-hand side of said lower row is separated from an inner one of said three wires of said lower row by a distance d, as measured from a center of said wires.

5. A low-voltage heating system in accordance with claim 4, wherein an outer one of said three wires on a right-hand side of said lower row is separated from an inner one of said three wires of said lower row by a distance d, as measured from a center of said wires.

6. A low-voltage heating system in accordance with claim 5, wherein said outer wires on said left-hand side of said upper and lower rows are connected together at a far end of said cable.

7. A low-voltage heating system in accordance with claim 6, wherein said outer wires on said right-hand side of said upper and said lower rows are connected together at said far end of said cable.

8. A low-voltage heating system in accordance with claim 7, wherein said inner wires of said upper and said lower rows are connected together at said far end of said cable.

9. A low-voltage heating system in accordance with claim 7, wherein there is a plurality of said at least one cable oriented and retained in cable runs disposed in parallel relationship to one another in a common plane and at a predetermined distance $D_R$ between each other.

10. A low-voltage heating system in accordance with claim 9, wherein said distance $D_R$ between adjacent cable runs of said plurality of cables is given by the formula $$D_R = P_C / P_D$$

wherein $D_R$ is expressed in meters, $P_D$ is the desired heating power density expressed in watts per square meter, and $P_C$ is said desired thermal power per unit length of said cable, expressed in watts per meter.

11. A low-voltage heating system in accordance with claim 10, wherein said system is a three-phase system having a 3-phase step-down transformer provided with three secondary terminals between which exists a line-to-line voltage which is said low voltage supply source, said secondary terminals being connected to three busbars constituting said feeder conductor means.

12. A low-voltage heating system in accordance with claim 11, wherein said three wires of said lower row at a near end of said cable are connected together and wherein a conductive extension of each of said three wires at said near end of said upper row constitute connecting leads of a wye cable.

13. A low-voltage heating system in accordance with claim 12, wherein said connecting leads contain a marking to identify their respective conductive extension to said right-hand side wire, said left-hand side wire and said inner wire of said upper row of said wye cable.

14. A low-voltage heating system in accordance with claim 13, wherein said connecting leads of a plurality of said wye cables are respectively connected to one of said three busbars, and wherein said horizontal axis of each said wye cable lies substantially o a common plane wherein to heat the said surface area.

15. A low-voltage heating system in accordance with claim 14, wherein said resultant magnetic flux density B is measured approximately in a middle of said surface area at a distance H perpendicular to said horizontal axes of said wye cables, and wherein said distance H is less than 1.7 times said distance $D_R$.

16. A low-voltage heating system in accordance with claim 15, wherein said resultant magnetic flux density B has a said specific value no greater than that given by a wye cable formula:

$$B = \frac{1.63 hd \sqrt{\frac{AP_C}{\rho}}}{H^3}$$

wherein the symbols carry the following units: h, d and H in meters, A in square meters, $P_C$ in watts per meter, $\rho$ in ohm-meters and B in milligauss, and wherein said h is the distance between said upper row and said lower row of said wires in a cable, said d is the distance between adjacent wires in one of said rows, A is the total cross section of all said six wires, $P_C$ is the thermal power per unit length of cable, $\rho$ is the resistivity of the wire material and said distance H is perpendicular to said horizon-al axes of said wye cables, and is less than 1.7 times said distance $D_R$.

17. A low-voltage heating system in accordance with claim 11, wherein, at a near end of said cable, said wire on said left-hand side of said upper row is connected to said inner wire of said lower row and said inner wire of said upper row is connected to said outer wire on said right-hand side of said lower row and said outer wire on said right-hand side of said upper row is connected to said outer wire on said left-hand side of said lower row.

18. A low-voltage heating system in accordance with claim 17, wherein a conductive extension of each of three wires at said near end of said upper row constitute connecting leads of a delta cable.

19. A low-voltage heating system in accordance with claim 18 wherein said connecting leads contain a marking to identify their respective conductive extension to said right-hand side wire, said left-hand side wire and said inner wire of said upper row of said delta cable.

20. A low-voltage heating system in accordance with claim 19, wherein said connecting leads of a plurality of said delta cables are respectively connected to one of said three busbars, said horizontal axes of said delta cables being substantially coplanar, wherein to heat said surface area.

21. A low-voltage heating system in accordance with claim 20, wherein said resultant magnetic flux density B is measured approximately in the middle of said surface area at a distance H perpendicular to said horizontal axes of said delta cables, and wherein said distance H is less than 1.7 times said distance $D_R$.

22. A low-voltage heating system in accordance with claim 21, wherein said resultant magnetic flux density B has a said specific value no greater than that given by a delta cable formula $$B = \frac{1.63 hd \sqrt{\frac{AP_C}{\rho}}}{H^3}$$

wherein the symbols carry the following units: h, d and H in meters, A in square meters, $P_C$ in watts per meter, $\rho$ in ohm-meters and B in milligauss, and wherein said h is the distance between said upper row and said lower row of said wires in a cable, said d is the distance between adjacent wires in one of said rows, A is the total cross section of all said six wires, $P_C$ is the thermal power per unit length of cable, ρ is the resistivity of the wire material and said distance H is perpendicular to said horizontal axes of said delta cables, and is less than 1.7 times said distance $D_R$.

23. A low-voltage heating system in accordance with claim 10, wherein said system is a single-phase system, said low voltage supply source having a single-phase step-down transformer provided with two secondary terminals between which exists a line-to-line voltage which is said low voltage supply source, said secondary terminals being connected to two busbars constituting said feeder conductor means.

24. A low-voltage heating system in accordance with claim 23, wherein, at a near end of said cable, said wire on said left-hand side of said upper row is connected to said inner wire of said lower row and said inner wire of said upper row is connected to said outer wire on said right-hand side of said lower row and said outer wire on said right-hand side of said upper row is connected to said outer wire on said left-hand side of said lower row.

25. A low-voltage heating system in accordance with claim 24, wherein at said near end of said cable, a conductive extension of each of said outer wire on said left-hand side of said upper row and of said inner wire of said upper row constitutes two connecting leads of a single-phase delta cable.

26. A low-voltage heating system in accordance with claim 25 wherein said two connecting leads contain a marking to identify then respective conductive extension to said left-hand side wire and said inner wire of said upper row of said single-phase delta cable.

27. A low-voltage heating system in accordance with claim 26, wherein said two connecting leads of a plurality of said single-phase delta cables are respectively connected to one of two of said busbars of said single-phase system, said horizontal axes of said single-phase cables being substantially coplanar, wherein to heat the said surface area.

28. A low-voltage heating system in accordance with claim 27, wherein each said single-phase delta cable of said plurality of cables has two or more contiguous cable runs, with loop ends of adjacent said contiguous cable runs being twisted whereby successive ones of said upper rows and said lower rows of each said single-phase delta cable are alternately interchanged so that said currents flowing in correspondingly-located wires of all said cable runs of said surface area have substantially the same magnitudes and directions.

29. A low-voltage heating system in accordance with claim 28, wherein said resultant magnetic flux density B is measured approximately in a middle of said surface area at a distance H perpendicular to said horizontal axes of said single-phase delta cables, and wherein said distance H is generally greater than 0.4 times said distance $D_R$ and less than 2.4 times said distance $D_R$.

30. A low-voltage heating system in accordance with claim 29, wherein said resultant magnetic flux density B has a said specific value no greater than that given by a single-phase delta cable formula:

$$B = \frac{2hd^2 \sqrt{\frac{AP_c}{\rho}}}{H^4}$$

wherein the symbols carry the following units: h, d and H in meters, A in square meters, $P_C$ in watts per meter, ρ in ohm-meters and B in milligauss, and wherein said h is the distance between said upper row and said lower row of said wires in a cable, said d is the distance between adjacent wires in one of said rows, A is the total cross section of all six wires in the cable, $P_C$ is the thermal power per unit length of cable, ρ is the resistivity of the wire material and said distance H is perpendicular to said horizontal axes of said single-phase cables, and generally greater than 0.4 times said distance $D_R$ and less than 2.4 times said distance $D_R$.

31. A low-voltage heating system as claimed in claim 1, wherein each of said at least one cable is provided with a bare sensing conductor extending along the entire length thereof and in close proximity to said conductive heating wires, said sensing conductor being connected at one end to an insulated conductor which is in turn connected to an ouput of a monitoring device to detect a fault in one or more of said heating wires.

32. A low-voltage heating system as claimed in claim 31, wherein said monitoring device comprises an a.c. source that charges a capacitor by means of a diode connected between said a.c. source and said capacitor, an intermittently actuatable switch and a lamp connected in series between said capacitor and said output; said lamp being caused to blink, when a short-circuit occurs between one of said bare conductors and any of said conductive heating wires in any of said cables, by a discharge current of said capacitor into said short-circuit and through said lamp and said intermittently actuatable switch.

33. A low-voltage heating system as claimed in claim 32, wherein a further switch is connected across said lamp to bypass said lamp when said further switch is closed, to increase said discharge current through said short-circuit, whereby to obtain a stronger pulsating magnetic field surrounding said insulated conductor and said sensing conductor that lead to said short circuit, whereby to locate said short-circuit.

34. An extra-low-voltage heating system in accordance with claim 1 wherein said supply source is a three-phase source having a step-down transformer, said feeder conductor means being constituted by flat copper bars stacked one on top of another and separated by electrically insulating flat strips; there being five of said copper bars composed of a central bar, two outer bars, and two intermediate bars; said intermediate bars being respectively sandwiched between said central bar and said outer bars, and wherein each of said intermediate bars and each of said outer bars has half the thickness of said central bar, said central bar being connected at a near end of said feeder conductor means to a first one of three secondary terminals of said transformer, said outer bars being connected at said near end to a second one of said secondary terminals, said intermediate bars being connected at said near end to a third one of said secondary terminals, said busbar configuration resulting in a reduction of the flux density around said feeder conductor means when currents flow through said busbars.

35. An extra-low-voltage heating system as claimed in claim 1, wherein said cables have a flat, substantially rectangular cross-section.

36. An extra-low-voltage heating system in accordance with claim 1, wherein an external portion of said insulated sheath lying next to said upper row bears a marking for the purpose of correctly orienting said cable relative to said surface area.

* * * * *